US012647009B1

(12) United States Patent
Li et al.

(10) Patent No.: US 12,647,009 B1
(45) Date of Patent: Jun. 2, 2026

(54) NEUTRALIZING MAGNETIC COMPONENT ARRANGEMENTS IN A VARIABLE APERTURE DEVICE

(71) Applicant: Apple Inc., Cupertino, CA (US)

(72) Inventors: Wei Li, Sunnyvale, CA (US); Bin Xu, Sunnyvale, CA (US); Xu Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 18/660,121

(22) Filed: May 9, 2024

(51) Int. Cl.
*H02K 29/03* (2006.01)
*G03B 7/095* (2021.01)
*H02K 41/035* (2006.01)

(52) U.S. Cl.
CPC ............. *H02K 29/03* (2013.01); *G03B 7/095* (2013.01); *H02K 41/0354* (2013.01)

(58) Field of Classification Search
CPC ........ H04N 23/55; H04N 23/51; H04N 23/75; H04N 23/54; G03B 9/06; G03B 7/085; G03B 17/02; G03B 7/12; G03B 3/10; G03B 13/36; G03B 30/00; G02B 7/09; G02B 7/02; G02B 5/20; G02B 7/021
See application file for complete search history.

(56) References Cited

U.S. PATENT DOCUMENTS

| | | | |
|---|---|---|---|
| 3,295,429 A | 1/1967 | Stimson | |
| 4,339,186 A | 7/1982 | Yamazaki | |
| 4,355,875 A | 10/1982 | Yamazaki | |
| 6,139,202 A * | 10/2000 | Depatie | G03B 9/00 |
| | | | 396/449 |
| 9,659,700 B2 * | 5/2017 | Suomela | H01F 13/006 |

FOREIGN PATENT DOCUMENTS

JP          2005328633          11/2005

* cited by examiner

*Primary Examiner* — Leda T Pham
(74) *Attorney, Agent, or Firm* — Robert C. Kowert; Kowert, Hood, Munyon, Rankin & Goetzel, P.C.

(57) ABSTRACT

Various embodiments include a neutralizing magnetic component arrangement in a variable aperture device for a camera system. The variable aperture device may include a rotor, a stator, aperture blades arranged to form an aperture stop, and an actuator for moving the aperture blades to change a size of the aperture. In various embodiments, magnetic components of the actuator may include magnetic configurations which may cause a neutralizing force on the rotor, reducing or eliminating magnetic forces and magnetic torques exerted on the rotor from magnetic components of the variable aperture device.

20 Claims, 8 Drawing Sheets

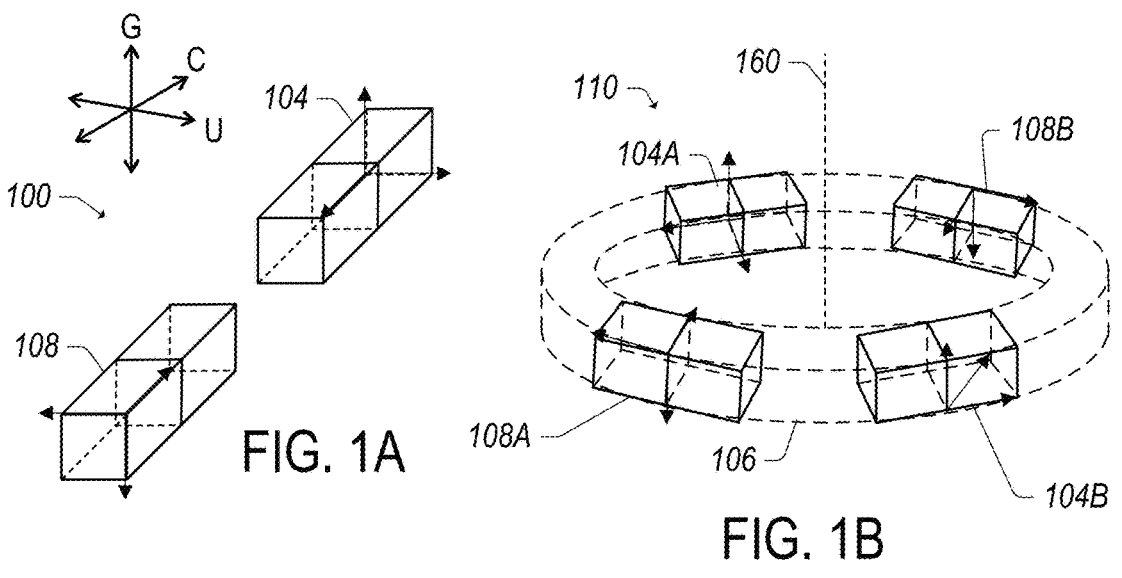
FIG. 1A
FIG. 1B
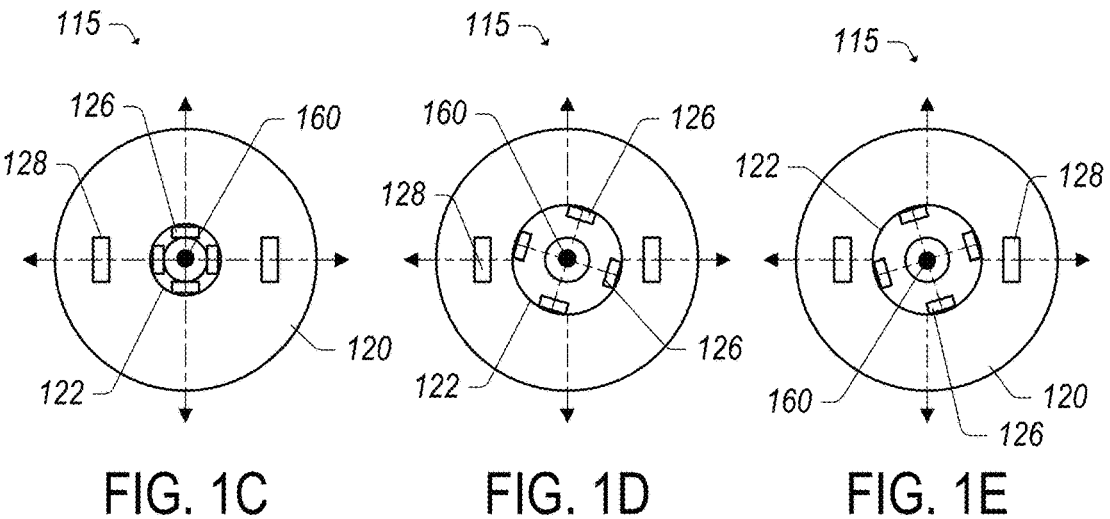
FIG. 1C      FIG. 1D      FIG. 1E
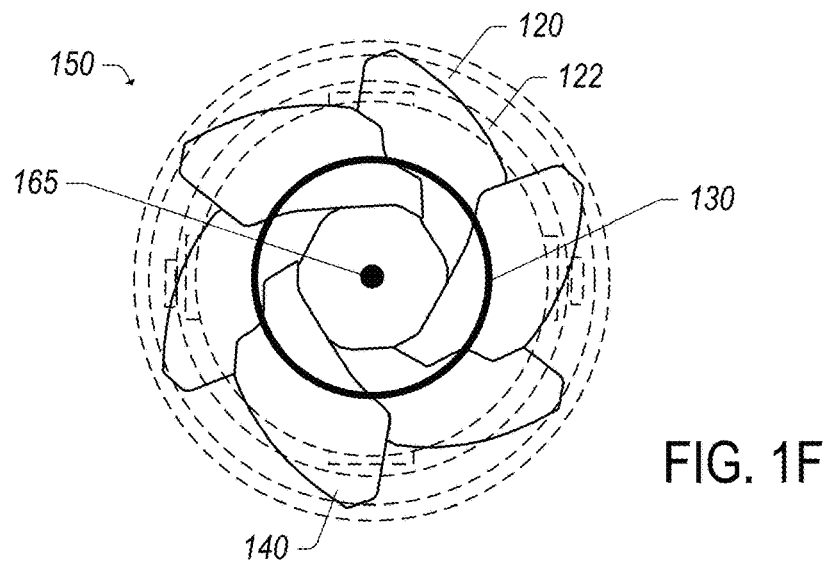
FIG. 1F

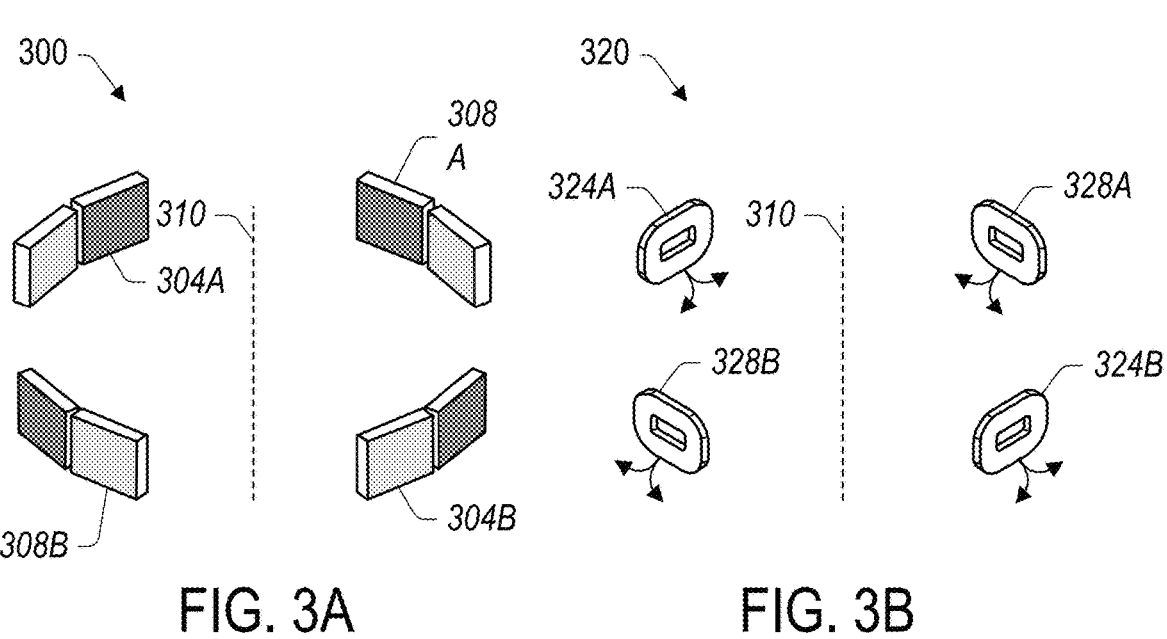
FIG. 3A          FIG. 3B
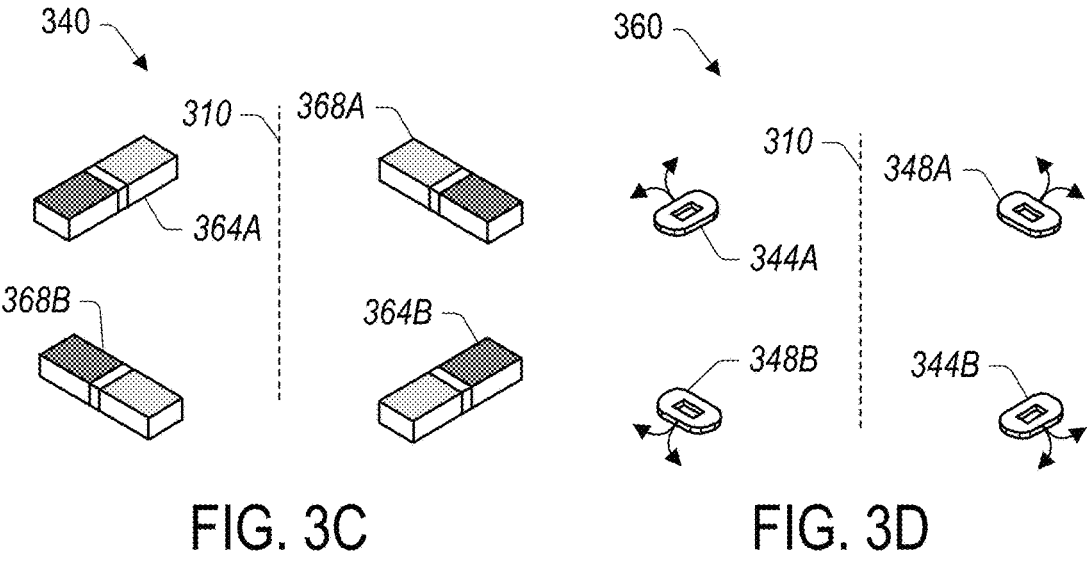
FIG. 3C          FIG. 3D

500

520B

530

520A

510

505

530

520B

520A

510

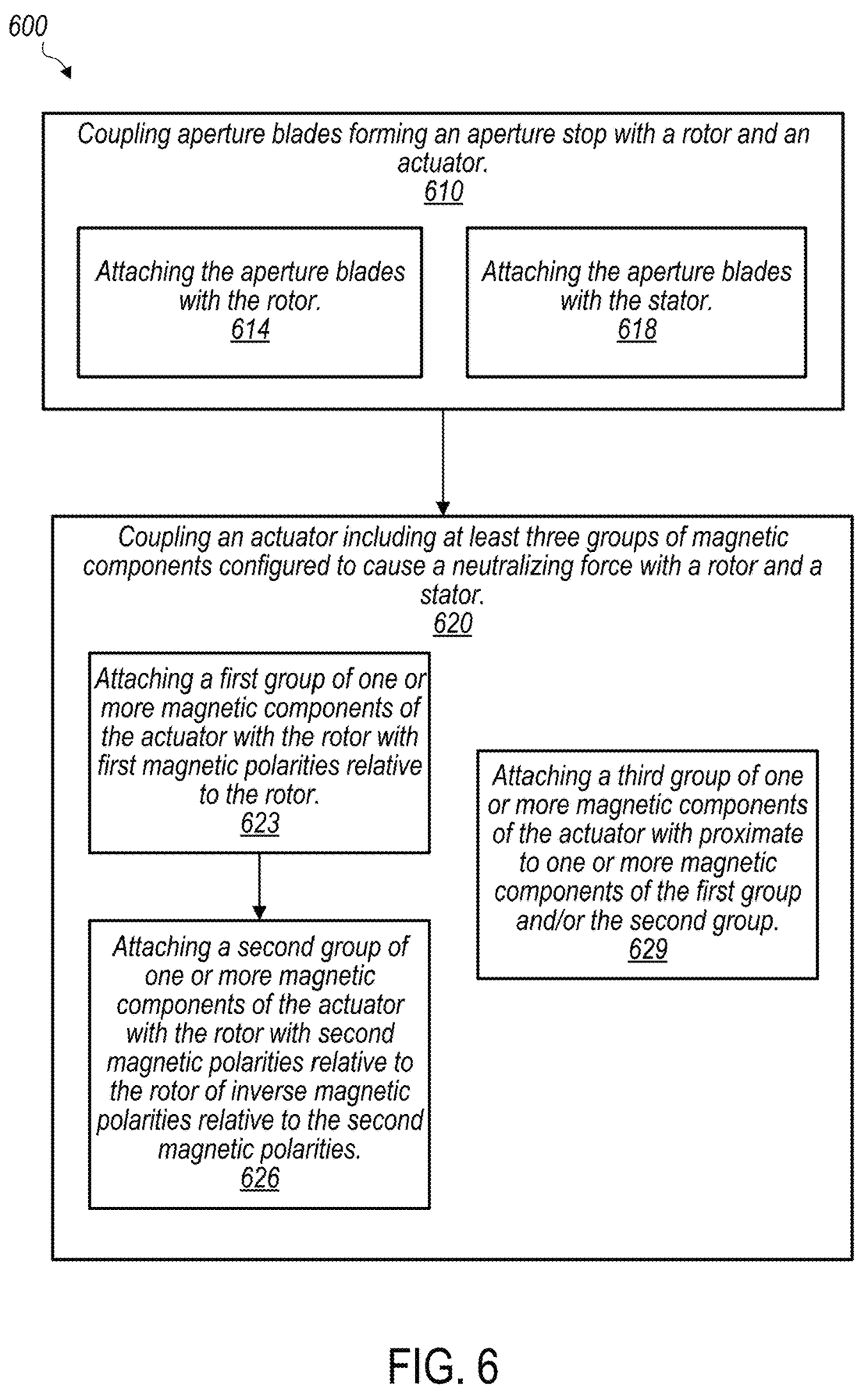

600

Coupling aperture blades forming an aperture stop with a rotor and an actuator.
610

Attaching the aperture blades with the rotor.
614

Attaching the aperture blades with the stator.
618

Coupling an actuator including at least three groups of magnetic components configured to cause a neutralizing force with a rotor and a stator.
620

Attaching a first group of one or more magnetic components of the actuator with the rotor with first magnetic polarities relative to the rotor.
623

Attaching a third group of one or more magnetic components of the actuator with proximate to one or more magnetic components of the first group and/or the second group.
629

Attaching a second group of one or more magnetic components of the actuator with the rotor with second magnetic polarities relative to the rotor of inverse magnetic polarities relative to the second magnetic polarities.
626

FIG. 6

NEUTRALIZING MAGNETIC COMPONENT ARRANGEMENTS IN A VARIABLE APERTURE DEVICE

BACKGROUND

Technical Field

This disclosure relates generally to magnetic components configurations configured to cause neutralizing forces that compensate for magnetic forces and magnetic torques of a rotor of a variable aperture device.

Description of the Related Art

Variable aperture devices may be used in various types of camera systems. A camera system may include one or more optical elements, such as a lens or image sensor. A variable aperture device may include aperture blades forming an aperture stop which may form an aperture of the camera system. The aperture formed by the variable aperture device may function to limit an amount of light that reaches the lens of the cameras system, for example. An actuator may be included in the variable aperture device, which may be used to change a size of the aperture formed by the variable aperture device.

BRIEF DESCRIPTION OF THE DRAWINGS

FIGS. 1A-1F illustrate examples of a magnetic balancing system that may be included in an magnetic component arrangement of a variable aperture device, which may be included in a camera system, according to some embodiments. FIG. 1A shows a first magnetic component configured to cause a neutralizing force on a second magnetic component 100. FIG. 1B shows a second magnetic component arrangement 110, similar to the first magnetic component arrangement 100, coupled with a cylindrical structure 106 and causing a neutralizing force on the cylindrical structure 106. FIGS. 1C-1E show an magnetic component arrangement 115 an actuator, for rotating a rotor 122 about an axis 160 relative to a stator 120, where the actuator may comprise of groups of magnetic components configured to cause a neutralizing force on the magnetic component arrangement 115. FIG. 1F shows a variable aperture device 150 with an actuator causing a neutralizing force on the variable aperture device 150, and the variable aperture device 150 may be included in a camera system.

FIG. 2A shows an exploded perspective view of the variable aperture device with a first actuator. FIG. 2B shows an exploded perspective view of the variable aperture device 250 with a second actuator.

FIGS. 3A-D illustrate various examples of different magnetic components that may be configured to cause neutralizing forces, according to some embodiments. FIG. 3A shows a first magnetic component arrangement comprising of various magnets causing a neutralizing force with magnetic polarities orthogonally opposed to an axis, and radially along towards the axis. FIG. 3B shows a second magnetic component arrangement comprising of various coils causing a normalizing force with magnetic polarities orthogonally opposed to an axis, and radially along towards the axis. FIG. 3C shows a third magnetic component arrangement 340 causing a normalizing force similar to the first magnetic component arrangement 300, with a difference of magnetic polarities of the third magnetic component are parallel to the axis. FIG. 3D shows a fourth magnetic component arrangement causing a normalizing force similar to the second magnetic component arrangement, with a difference of magnetic polarities of the fourth magnetic component are parallel to the axis.

FIG. 4A shows a variable aperture device including aperture blades forming a first aperture stop. FIG. 4B shows the variable aperture device forming a second aperture stop with the aperture blades. FIG. 4C shows the variable aperture device forming a third aperture stop with the aperture blades.

FIG. 5A shows a perspective view of an electromagnetic arrangement with magnetic polarities parallel to an axis that includes a dual-pole magnet in a magnet-coil group with a single coil. FIG. 5B shows a similar embodiment to FIG. 5A, differing with magnetic polarities of the magnetic components of the electromagnetic arrangement being orthogonally opposed to the axis.

FIG. 6 is a flowchart that illustrates an example method of assembling a variable aperture device including an actuator causing a neutralizing force, according with some embodiments.

Figure 2A:
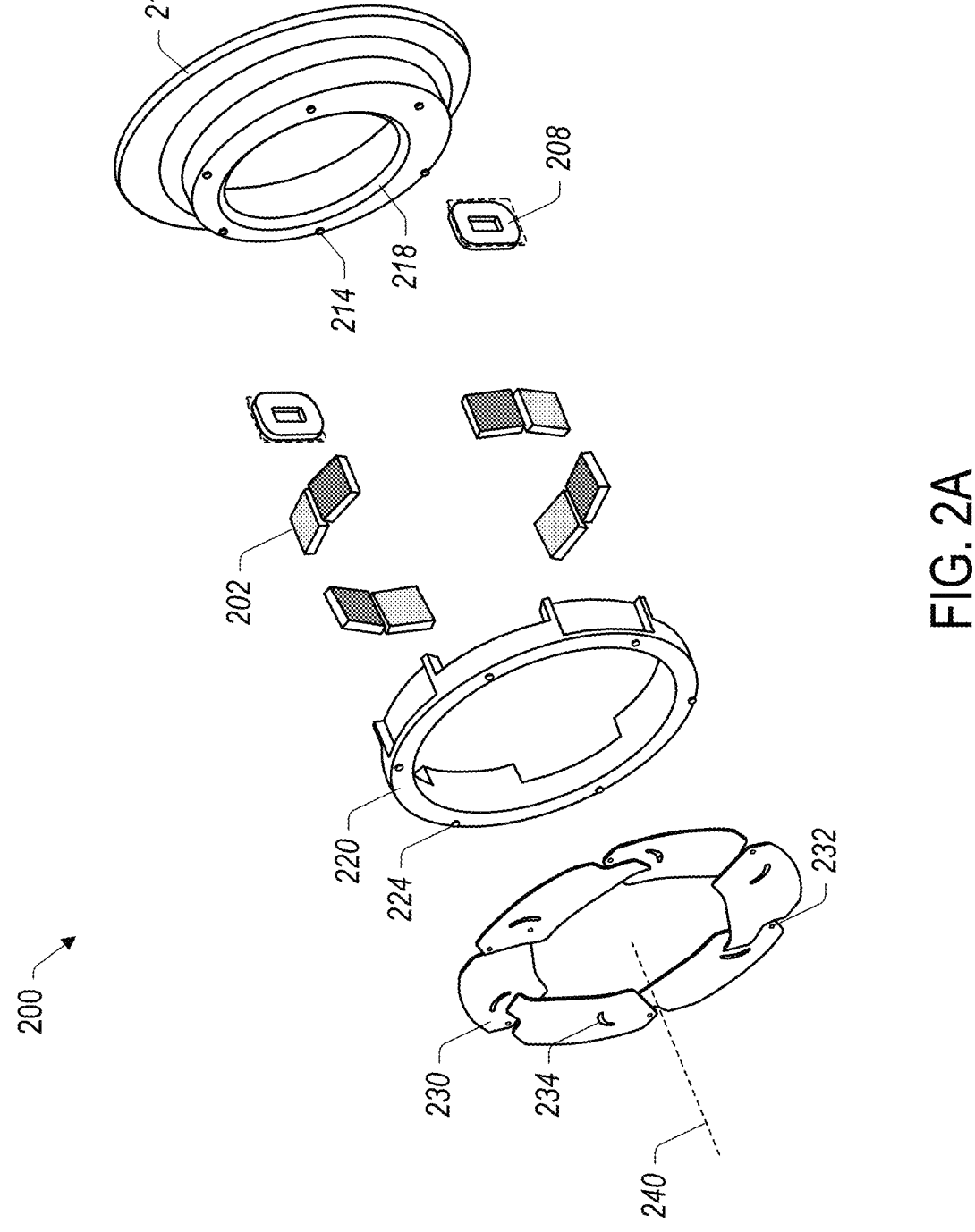
FIGS. 2A-2B illustrate views of an example variable aperture device with a neutralizing force that may be included in a camera system, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a variable aperture device for a camera system. The variable aperture device may include aperture blades arranged to form an aperture stop. An actuator may be used for moving the aperture blades to change the size of the aperture blades within a range of aperture sizes. The aperture stop may function to limit the amount of light that reaches the lens group via the aperture. Aspects of the variable aperture device described herein solve problems that may exist in other camera systems, such as problems pertaining to camera/device aperture stop, and/ or performance of the camera/device forming the various aperture stops, as will be discussed in further detail throughout this disclosure.

In various embodiments, the stator may include a base portion, a central portion, and an outer protrusion portion. The central portion may extend, in a first direction parallel to an optical axis of the camera system, from an upper surface of the baser portion. In some embodiments, the central portion may be cylindrically shaped, with a through hole centrally located so that light can pass through the variable aperture device to the lens group. The outer protrusion portion may comprise protrusions that extend, in the first direction, from the upper surface of the base portion. The upper surface of the base portion may extend, in a second direction orthogonal to the optical axis, between the central portion and the outer protrusion portion. The protrusions may be distributed in a pattern that at least partially encircles the central portion. According to various embodiments, the rotor may include a rotor wall that encircles the central portion of the stator. The rotor wall may be positioned, in the second direction orthogonal to the optical axis, between the central portion and the outer protrusion portion of the stator.

In various embodiments, the actuator may be configured to rotate the rotor, relative to the stator, about an axis that is parallel to the optical axis. The actuator may include a first portion fixedly coupled with the rotor wall, and a second portion fixedly coupled with the outer protrusion portion of the stator. The aperture blades may be coupled with the stator and the rotor. Rotation of the rotor may cause the aperture blades to move as to change the size of the aperture.

In some embodiments, the actuator may include a voice coil motor (VCM) actuator having one or more magnets and one or more coils. The coil(s) may be positioned proximate the magnet(s) such that, when driven with an electric current, the coil(s) are capable of electromagnetically interacting with the magnet(s) to produce Lorentz forces that rotate the rotor about the axis parallel to the optical axis. In some embodiments, the magnet(s) may be fixedly coupled with the rotor wall, and the coil(s) may be fixedly coupled with the outer protrusion portion of the stator. In other embodiments, the coil(s) may be fixedly coupled with the rotor wall, and the magnet(s) may be fixedly coupled with the outer protrusion portion of the stator.

In some embodiments, the one or more magnets and/or the one or more coils of the actuator may be placed to cause a neutralizing force on the variable aperture device. The neutralizing force caused on the variable aperture device may reduce, or eliminate, magnetic forces and magnetic torque exerted on the rotor from electromagnetic interactions of the one or more magnet and/or the one or more coils with the rotor. In various embodiments, the neutralizing force may reduce the magnetic forces and the magnetic torque exerted on the rotor during rotation of the rotor relative to the stator with the actuator.

As compared with some other systems, the configuration of the VCM, the rotor, and the stator disclosed herein with the neutralizing force enable a reduction in power to utilize the VCM to operate the variable aperture device and change the aperture stop formed with the aperture blades (e.g., the reduction of magnetic forces and magnetic torques on the rotor from the neutralizing force requires a lesser amount of power to rotate the rotor in comparison if the rotor contained the magnetic forces and magnetic torques eliminated by the neutralizing force, improving system or device performance by reducing power requirements to implement the variable aperture device), as well as an amount of power required to hold the aperture blades forming the aperture stops. The reduction of magnetic forces and magnetic torques on the rotor from the neutralizing force may lead to more control of the rotor during rotation of the rotor in comparison with other systems not comprising the neutralizing force.

In some embodiments, the aperture blades may be designed so that they form a circular aperture at a particular aperture size. The circular aperture may be a close approximation of a circular shape, e.g., approaching the shape of a circle rather than a polygon. As compared with variable aperture designs of some other systems, the circular aperture may be closer to a circular shape and those other systems may have apertures having shapes that appear more polygonal (e.g., hexagonal) than circular across the entire range of aperture sizes.

In some non-limiting embodiments, the particular aperture size at which the aperture blades are design to form a circular shape may be an aperture size that is between the largest aperture size and the smallest aperture size within the range of aperture sizes that the variable aperture device is capable of forming. For example, the particular aperture size at which the aperture blades are optimized to form a circular shape may be a middle/intermediate aperture size within the range of aperture sizes in some embodiments.

Various parameters may be optimized to achieve this objective. For example, such parameters may include shape and/or size of the aperture blades, coupling slots defined by the aperture blades, and/or coupling pin holes defined by the aperture blades, as well as the geometry of the stator, the rotor, pins on the stator and the rotor with which the aperture blades may be coupled (e.g., via the coupling slots and the coupling pin holes), etc.

Although not illustrated, according to various embodiments, the variable aperture device may include a locking mechanism comprising one or more metal plates fixedly coupled with the stator or the rotor. The locking mechanism may be used to maintain the variable aperture device at a particular aperture size when no power is supplied to the actuator.

In some embodiments, the variable aperture device and/or the camera system may be operable such that when no power is supplied to the actuator, an attractive force between one or more magnetic components of the actuator (e.g., one or more magnets of the VCM actuator) and the metal plate(s) is sufficient to maintain a predetermined aperture size by resisting rotation of the rotor, relative to the stator, about the axis parallel to the optical axis.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail as not to unnecessarily obscure aspects of the embodiments.

FIGS. 1A-1F illustrate examples of a magnetic balancing system that may be included in an magnetic component arrangement of a variable aperture device, which may be included in a camera system, according to some embodiments. FIG. 1A shows a magnetic component arrangement 100 configured to cause a neutralizing force on the magnetic component arrangement 100. FIG. 1B shows a second magnetic component arrangement 110, similar to the first magnetic component arrangement 100, coupled with a cylindrical structure 106 and causing a neutralizing force on the cylindrical structure 106. FIGS. 1C-1E show an magnetic component arrangement 115 an actuator, for rotating a rotor 122 about an axis 160 relative to a stator 120, where the actuator may comprise of groups of magnets configured to cause a neutralizing force on the magnetic component arrangement 115. FIG. 1F shows a variable aperture device 150 with an actuator causing a neutralizing force on the variable aperture device 150, and the variable aperture device 150 may be included in a camera system.

As shown in FIG. 1A, the magnetic component arrangement 100 may comprise of a first and second magnetic components 104 and 108 of opposite polarities to one another and placed within a proximity of each other, causing a neutralizing force on the magnetic component arrangement 100, according to some embodiments. The magnetic components 104 and 108 may be configured with respect to one another such that, an interaction between magnetic polarities from the magnetic components 104 and 108 may cause the neutralizing force. The neutralizing force may reduce, or eliminate, magnetic forces and magnetic torque exerted on the magnetic component arrangement 100.

In various embodiments, the neutralizing force reduces or eliminates magnetic forces and magnetic torques caused by magnetic components which are also configured to also cause the neutralizing force. For example, as illustrated in FIG. 1A, the magnetic polarity of the magnetic component 104 may be resolved into first magnetic vector components with directions parallel to C, G and U-axes. The magnetic polarity of the magnetic component 108 may be resolved into second magnetic vector components with directions parallel to C, G, and U-axes, and of opposite directions with the first magnetic vector components, respectively. The second magnetic vector components may interact electromagnetically with the first magnetic vector components causing the neutralizing force along the directions parallel to the C, G, and U-axes, and the electromagnetic interaction may reduce, or eliminate, forces and torque on the magnetic component arrangement 100 caused by the first and second vector components of the magnetic component 104 and 108, respectively.

Those skilled in the art will appreciate that, while magnetic components 104 and 108 are illustrated in a configuration as illustrated in FIG. 1A, the magnetic components 104 and 108 may be configured in various different designs where the various different designs may cause a neutralizing force (e.g., the magnetic components of FIGS. 3A-3D). For example, the magnetic components 104 and 108 may be oriented, with respect to one another, with a longest dimension from each magnetic component 104 and 108 parallel to one another, causing the neutralizing force.

According to some embodiments, both magnetic components 104 and 108 may be identical magnets to one another. For example, both magnetic components 104 and 108 may share a same shape, a same material, a same magnitude of magnetic fields, etc., such that both magnetic components 104 and 108 interact electromagnetically with one another with equal magnitudes, causing the neutralizing force which eliminates magnetic forces and magnetic torque on the magnetic component arrangement 100. As those skilled in the art will appreciate, magnetic components 104 and 108 being identical to one another may be close to unachievable in practical terms for complexities in manufacturing identical objects. As such, in various embodiments, the magnetic components 104 and 108 may instead be near-identical to one another, resulting in a near-identical electromagnetic interaction between the magnetic components 104 and 108 and causing a neutralizing force which reduces magnetic forces and magnetic torque on the magnetic component arrangement 100 near-elimination (e.g., reduce the magnetic forces and magnetic torque to zero, in reference to the magnetic component arrangement 100, etc.).

According to some embodiments, the magnetic components 104 and 108 may be magnets 104 and 108 (e.g., respective dual-pole magnets and/or sets of two single-pole magnets positioned together as illustrated in FIGS. 1A and 1B with broken lines intersecting the magnetic components, and as discussed below with regard to FIGS. 5A-5B), and where an electromagnetic interaction between the magnets 104 and 108 causes a neutralizing force on the magnetic component arrangement 100. In other embodiments, the magnetic components 104 and 108 may be coils 104 and 108 (e.g., wound coils or etched coils as also discussed below with regard to FIGS. 5A-5B), where an electromagnetic interaction between the coils 104 and 108 causes the neutralizing force. In even further embodiments, the magnetic components 104 and 108 may arbitrarily be a magnet and a coil, where the magnet and coil may also electromagnetically interact with one another, causing the neutralizing force.

In various embodiments, a magnetic component of the magnetic components 104 and 108 may arbitrarily be an actuator magnet of a magnet-coil group of an actuator (e.g., voice coil motor (VCM) actuator, etc.). Similar to the magnet-coil groups discussed below with regard to FIGS. 5A-5B, the actuator magnet may be configured to interact electromagnetically with a coil of the magnet-coil group, causing Lorentz forces (e.g., actuators discussed below in FIGS. 1C-1F, etc.). The other magnetic component of magnetic components 104 and 108 not comprising of the actuator magnet may be a neutralizing magnet. The neutralizing magnet may be positioned proximate to the actuator magnet, and based on magnetic polarities and magnetic fields of the actuator magnet such that, the neutralizing magnet may interact electromagnetically with the actuator magnet, causing a neutralizing force which reduces magnetic forces and magnetic torques from the actuator magnet. For example, in some embodiments, the magnetic component 104 may be an actuator magnet 104 and the magnetic component 108 may be a neutralizing magnet 108. The actuator magnet 104 may be positioned proximate to a coil of a magnet-coil group of an actuator, and the actuator magnet 104 may be configured to interact electromagnetically with the coil as part of a function of the actuator. The neutralizing magnet 108 may then be coupled proximate to the actuator magnet 104 and according to magnetic polarities and magnetic fields of the actuator magnet 104, such that, the neutralizing magnet 108 may interact electromagnetically with the actuator magnet 104, causing a neutralizing force which reduces magnetic forces and magnetic torques exerted by the actuator magnet 104 on the magnetic component arrangement. In other further embodiments, the magnetic component 108 may be an actuator magnet 108 and the magnetic component 104 may be a neutralizing magnet 104, where the actuator magnet 108 and the neutralizing magnet 108 may be configured to interact electromagnetically with one another, causing a neutralizing force on the magnetic component arrangement 100, as mentioned above.

FIG. 1B illustrates a second magnetic component arrangement 110 coupled with a cylindrical structure 106 causing a neutralizing force on the cylindrical structure 106, according to some embodiments. As shown in FIG. 1B, a first selection may include magnetic components 104A-B and a second selection may include magnetic components 108A-B. Similarly to the magnetic components of FIG. 1A, the first selection and the second selection may interact electromagnetically with one another, causing a neutralizing force on the magnetic component arrangement 110. The first selection may be coupled with the cylindrical structure 106 with magnetic components 104A and 104B diametrically opposed of one another, and orthogonally opposed of an axis 160 concentric with the cylindrical structure 106. The second selection may be coupled with the cylindrical structure 106 with inverse magnetic polarities relative to magnetic polarities of the first selection, and the second selection may be coupled with the cylindrical structure 106 diametrically opposed of one another, orthogonally opposed to the axis 160, and orthogonally opposed to the first selection.

According to some embodiments, the cylindrical structure 106 may include a cylindrical structure wall. The cylindrical structure wall may be positioned, along a direction orthogonal to the axis 160. The magnetic components 104A-B and 106A-B may be coupled with the cylindrical structure wall as mentioned above, causing the neutralizing force on the magnetic component arrangement 110. The neutralizing force may reduce or eliminate magnetic forces and magnetic torques exerted on the cylindrical structure 106 by the magnetic components 104A-B and 108A-B (e.g., magnetic component arrangement 100 of FIG. 1A). In other embodiments, the cylindrical structure 106 may be a rotor 106 (e.g., the rotor 122 of FIGS. 1C-1F) which may be included in an actuator, where the neutralizing force caused by the magnetic components 104A-B and 108A-B reduces magnetic forces and magnetic torques exerted on the rotor 106 of the actuator.

Similarly to magnetic polarities of magnetic components resolved to vector components in FIG. 1A, the magnetic components 104A-B and 108A-B may each comprise of a magnetic polarity which may be similarly resolved into respective vector components. As illustrated in FIG. 1A, the magnetic component 104A may include a first vector component 104A orthogonally opposed to axis 160 and radially directed to axis 160; a second vector component 104A tangential with the cylindrical structure wall and orthogonally opposed to axis 160; and a third vector component 104A parallel to the axis 160. The magnetic component 108B may include a first vector component 108B orthogonally opposed to axis 160, radially directed towards the axis 160, and orthogonally opposed to the first vector component 104A; a second vector component 108B tangential with the cylindrical structure wall, along a radial direction opposite to the second vector component 104A, and orthogonally opposed to axis 160; and a third vector component 108B parallel to the axis 160 and of opposite direction to the third vector component 104A. The magnetic component 104B may include a first vector component 104B orthogonally opposed to axis 160, radially directed towards the axis 160, and diametrically opposed to the first vector component 104A; a second vector component 104B tangential with the cylindrical structure wall, along a radial direction similar to the second vector component 104A, orthogonally opposed to the axis 160; and a third vector component 104B parallel to the axis 160 and of similar direction to the third vector component 104A. The magnetic component 108A my include a first vector component 108A orthogonally opposed to the axis 160, radially directed towards the axis 160, and diametrically opposed to the first vector component 108B; a second vector component 108A tangential with the cylindrical structure wall, along a radial direction similar to the second vector component 108B, and orthogonally opposed to the axis 160; and a third vector component 108A parallel to the axis 160 and of similar direction to the third vector component 108B. Individual ones of the vector components of magnetic components 104A-B and 108A-B may interact electromagnetically with other ones of the vector components comprising of opposite magnetic polarities to the individual ones, causing the neutralizing force on the magnetic component arrangement 110. The neutralizing force may reduce, or eliminate, magnetic forces and magnetic components exerted on the cylindrical structure 106, from the magnetic components 104A-B and 108A-B.

Similarly to the magnetic components discussed above with regard to FIG. 1A, the magnetic components 104A-B and 108A-B may be magnets causing the neutralizing force on the magnetic component arrangement 110 (e.g., magnetic component arrangements 300 and 340 of FIGS. 3A and 3C). In other embodiments, the magnetic components 104A-B and 108A-B may be coils causing the neutralizing force on the magnetic component arrangement 110 (e.g., magnetic component arrangements 320 and 360 of FIGS. 3B and 3D). The magnets, or coils, may be coupled with the cylindrical structure 106 with configuration as to cause the neutralizing force. In further embodiments, the magnetic components 104A-B and 108A-B may arbitrarily comprise of magnets and coils, where both magnets and coils may be coupled with the cylindrical structure 106 and configured to cause the neutralizing force.

According to some embodiments, the magnetic components 104A-B may be actuator magnets 104A-B, and the magnetic components 108A-B may be neutralizing magnets 108A-B. Similarly to the actuator magnet 104 and the neutralizing magnet 108 of FIG. 1A, the actuator magnets 104A-B may be included in magnet-coil groups of an actuator (e.g., voice coil motor (VCM) actuator, etc.) and configured to interact electromagnetically with coils of the magnet-coil groups, and the neutralizing magnets 108A-B may be coupled with the cylindrical structure 106 to cause a neutralizing force on the magnetic component arrangement 110, reducing or eliminating magnetic forces and magnetic torques exerted on the cylindrical structure 106 from the actuator magnets 104A-B. For example, the neutralizing magnets 108A-B may be coupled individually according to the individual ones of the actuator magnets 104A-B, such that, the magnetic forces and magnetic torques exerted on the cylindrical structure 106 from the actuator magnets 104A-B, are reduced or eliminated by magnetic polarities and magnetic fields of the neutralizing magnets 108A-B interacting electromagnetically with the magnetic fields and magnetic polarities of the actuator magnets 104A-B. According to other embodiments, the magnetic components 108A-B may be actuator magnets 108A-B, and the magnetic components 104A-B may be neutralizing magnets 104A-B, where the neutralizing magnets 104A-B may be coupled with the cylindrical structure 106 based on the actuator magnets 108A-B to cause the neutralizing force on the cylindrical structure 106, as discussed above.

As mentioned above, the cylindrical structure 106 may be a rotor 106 and may be included in a variable aperture device (e.g., variable aperture devices 115 and 150 of FIGS. 1C-1D and IF respectively, etc.) causing a neutralizing force on the variable aperture device, according to some embodiments. The magnetic components 104A-B and 108A-B may be included in an actuator of the variable aperture device (e.g., a voice coil motor (VCM) actuator as discussed below with regards to FIGS. 2A-2B) to rotate the rotor 106, about an axis of the variable aperture device, relative to a stator of the variable aperture device.

FIGS. 1C-1E illustrate views of a rotor 122, a stator 120, and an actuator which may be included in a variable aperture device, according to some embodiments. FIG. 1C shows a perspective view of the magnetic component arrangement 115 in a first state (also referred to herein as "first state"). FIG. 1D shows a perspective view of the magnetic component arrangement 115 in a second state having rotor 122 at a first partial revolution, relative to stator 120 (also referred to herein as "second state"). FIG. 1E shows a perspective view of the magnetic component arrangement 115 in a third state having rotor 122 at a second partial revolution, relative to stator 120 (also referred to herein as "third state").

According to various embodiments, the magnetic component arrangement 115 may include stator 120, rotor 122 (e.g., may be similar to the cylindrical structure of FIG. 1B), axis 160 (e.g., may be the same as axis 160 in FIG. 1B), an actuator (e.g., a Voice Coil Motor (VCM) actuator, etc.) comprising a first group of magnetic components 126, fixedly coupled with the rotor, and a second group of magnetic components, fixedly coupled with the stator 120. The first group of magnetic components 126 may be coupled with the rotor 122 in a configuration which may cause a neutralizing force on the rotor 122 (e.g., similar to the neutralizing forces caused by magnetic components as discussed in FIGS. 1A-B). The rotor 122 may include opening 130 as shown in FIGS. 1C-1E, and the axis 160 may be positioned concentric within the opening 130. The magnetic component arrangement 115 may include additional components that are not shown in FIGS. 1C-1E. For example, the magnetic component arrangement 115 may include components such as, but not limited to, a lens group, a suspension system, a locking mechanism, and/or sensors (e.g., rotation sensors), etc.

In some embodiments, the first group of magnetic components 126 may be coupled with the rotor 122 and configured to cause a neutralizing force which may reduce or eliminate magnetic forces and magnetic torques exerted on the rotor 122 from the first group of magnetic components 126 (e.g., the magnetic component arrangement 110 of FIG. 11B. The neutralizing force may allow the rotor 122 to experience minimal magnetic forces and magnetic torques, or none at all. Similarly, the neutralizing force may allowing the rotor 122 to rotate about the axis 160 relative to the stator 120, experiencing minimal magnetic forces and magnetic torque exerted on the rotor 122 during the rotation.

The first group of magnetic components 126 may include actuator magnets configured to interact electromagnetically with the second group of magnetic components 128 (e.g., coils, etc.), and the first group of magnetic components 126 may also include neutralizing magnets configured to reduce or eliminate magnetic forces and magnetic torques exerted on the rotor 122 from the actuator magnets, similar to the neutralizing magnets and the actuator magnets discussed above with regard to FIGS. 1A and 1B, according to some embodiments. The actuator magnets may include one or more actuator magnets coupled with the rotor 122 and configured to interact electromagnetically with coils (e.g., wound coils or etched coils as discussed below with regard to FIGS. 5A-5B, etc.) coupled with the stator 120, and the neutralizing magnets may also be coupled with the rotor 122 according to magnetic polarities and magnetic fields of the actuator magnets to cause a neutralizing force, reducing or eliminating the magnetic forces and magnetic fields exerted on the rotor 122 from the actuator magnets. The number of neutralizing magnets may be based on a number of actuator magnets, such that, the neutralizing magnets may interact or reduce all the magnetic forces and magnetic torques exerted from the number of actuator magnets on the rotor 122. In various other embodiments, the actuator magnets may be coupled with the stator 120 and configured to interact electromagnetically with the coils, coupled with the rotor 122. The neutralizing magnets may also be coupled with the stator 120, and configured to interact electromagnetically with the actuator magnets, causing the neutralizing force which, may reduce or eliminate the magnetic forces and the magnetic torques exerted on the rotor 122 from the actuator magnets.

Figure 2B:
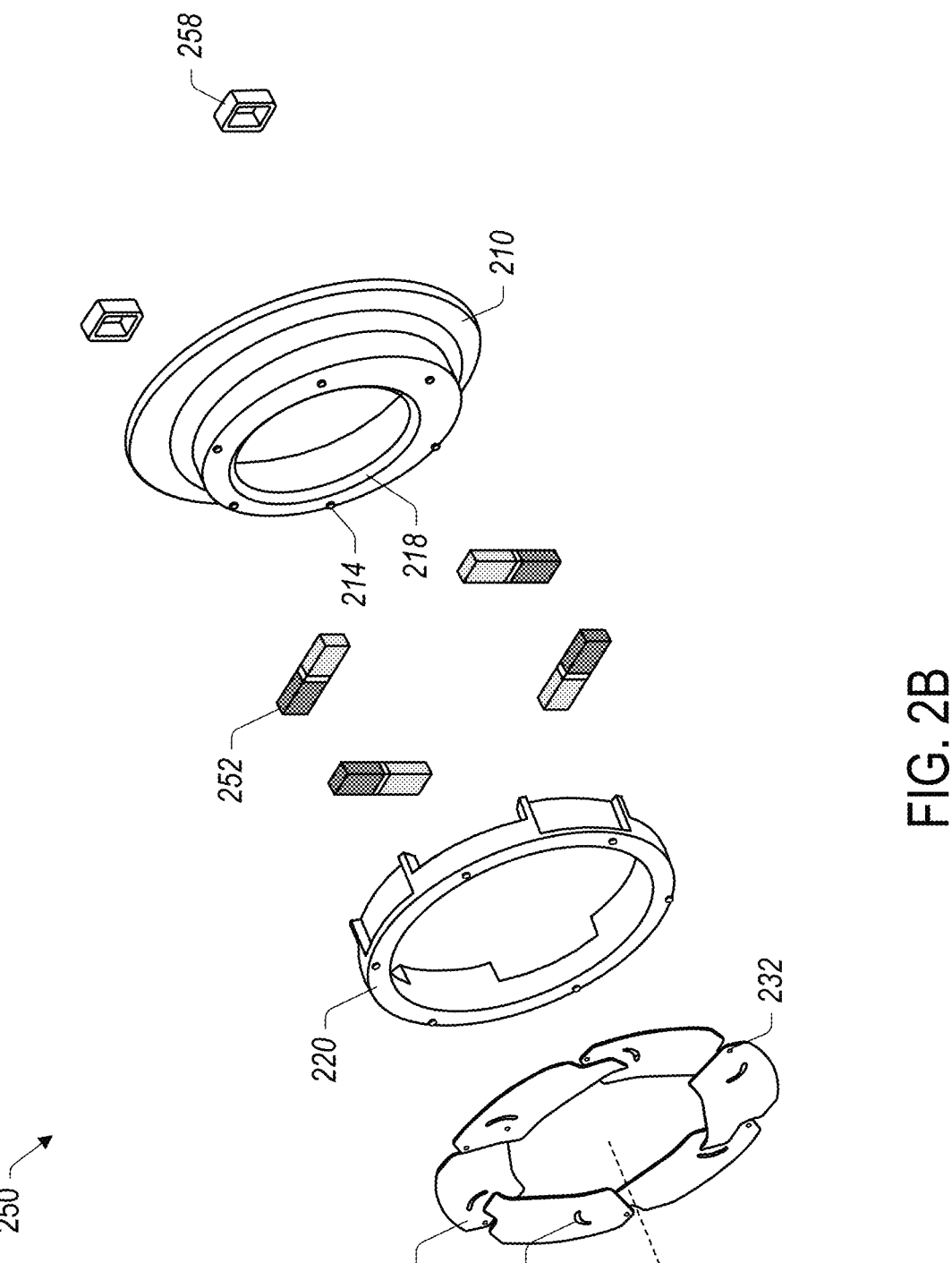

According to various embodiments, the stator 120 may comprise at least of a base portion, a central portion, and an outer protrusion portion (e.g., similar to the stators 210 and 260 discussed in detail in FIGS. 2A and 2B, respectively, etc.). The rotor 122 may include a rotor wall where, the rotor wall may be positioned in a direction orthogonal to the axis 160, between the central portion and the outer protrusion portion of the stator 120.

The second group of magnetic components 128 may be coupled with the stator 120, positioned proximate to the first group of magnetic components 126, according to some embodiments. The second magnetic components 128 may be capable of electromagnetically interacting with the first group of magnetic components. For example, in various embodiments, the first group of magnetic components 126 may comprise of magnets (referred to herein as magnets 126) (e.g., the magnets may be similar magnets to those discussed in detail in FIGS. 3A-3D), and the second group of magnetic components 128 may comprise of coils (referred to herein as coils 128). An electric current may be driven through coils 128, such that, the coils 128 are capable of electromagnetically interacting with the magnets 126 to produce Lorentz forces that rotate the rotor 122 bout the axis 160. The actuator comprising the first and second groups may rotate the rotor 122 to different radial positions relative to the stator 120, similar to the second state and the third state as shown in FIGS. 1D and 1E, respectively.

In various embodiments, the first state of the magnetic component arrangement 115 may be a first radial position of the rotor 122 relative to the stator 120, when the actuator of the magnetic component arrangement 115 is not receiving power. A first threshold amount of power may be supplied to the actuator, causing the actuator to rotate the rotor 122, relative to the stator 120, to a second radial position which may be the second state of the magnetic component arrangement 115. A third threshold amount of power may be supplied to the actuator, causing the actuator to rotate the rotor 122, relative to the stator 120, to a third radial position which may be the third state of the magnetic component arrangement 115. In other embodiments, the second state may be the first radial position of the rotor 122, relative to the stator 120, when the actuator is not receiving power. The first state may be the second radial position of the rotor 122, relative to the stator 120, when the actuator receives a first threshold amount of power (e.g., a positive current delivered to coils 128). The third state may be the third radial position of the rotor 122, relative to the stator 120, when the actuator may receive a second threshold amount of power (e.g., a negative current delivered to coils 128). In other embodiments, a configuration of magnetic components 126 and/or 128 may comprise of more states than the three states, the first state, the second state and the third state, where the more than three states may allow the rotor 122 to rotate to more states than the first state, the second state and the third state.

In some embodiments and as discussed above, a normalizing force may reduce or eliminate the magnetic forces and the magnetic torques from magnets 126 relative to the rotor 126, and one or more external magnetic forces and/or magnetic torques may be further exerted on the rotor 122 from the coils 126. In various embodiments, the normalizing force may reduce or eliminate the magnetic forces and magnetic torques exerted on the rotor 122. However, as an expert in the art will appreciate, it may be unrealistic for the neutralizing force to eliminate all the magnetic forces and the magnetic torques based at least on the external magnetic forces and/or magnetic torque exerted on the rotor 122. The actuator may rotate the rotor 122, relative to the stator 120, to radial positions such as first state, the second state and the third state, with a normalization force that may not fully eliminate all the magnetic forces and the magnetic torques experienced by the rotor 122. In comparison to an example magnetic component arrangement which may not comprise of a normalizing force, the rotor 122 may rotate with more stability and less forces to overcome (e.g., magnetic forces or magnetic torques, etc.) than an example rotor rotating with no normalizing force reducing the magnetic forces and magnetic torques of the example rotor.

In some embodiments, an example actuator rotating an example rotor relative to an example stator without a normalizing force may require a threshold amount of power capable of overcoming the magnetic forces and the magnetic fields of the example actuator. In comparison, the rotor 122 may rotate around the stator 120 with the neutralizing force, where the neutralizing force may lessen the threshold amount of power required to rotate the rotor 122. The neutralizing force may also improve the stability of the rotor 122 during rotation by removing, or reducing, forces that would create unwanted displacements for the rotor 122 during rotation (e.g., the rotor 122 might vibrate during rotation from the magnetic forces and the magnetic torques if the normalizing force was absent).

Although not illustrated, the magnetic component arrangement 115 may include a locking mechanism which may securely position the rotor 122, according to some embodiments. The locking mechanism may comprise of metal sheets coupled with the stator 120, placed within a proximity of the magnets 126. The magnets 126 may interact magnetically with the metal sheets, causing a magnetic force and securely positioning the magnets 126 close to the respective metal sheets. When a threshold amount of power is supplied to the magnetic component arrangement 115, the actuator may exert a magnetic force on the torque 122 which may overcome the magnetic force between the magnets 126 and the metal sheets, causing the rotor 122 to rotate to a radial position about the axis 160, relative to the stator 120.

In some embodiments, the metal sheets from the locking mechanism may interact with the normalizing force. The magnets 126 may be coupled and configured with the rotor 122 based on other ones of the magnets 126 and the metal sheets, such that, a normalization force may be caused. This normalization force may reduce, or eliminate, the magnetic forces and the magnetic torque exerted on the rotor 122 from the magnets 126, as well as the normalization force may reduce, or eliminate, forces caused between the metal sheets with the rotor 122 and the magnets 126.

Although FIGS. 1C-1E show magnets 126 coupled with the rotor 122 and the coils 128 coupled with the stator 120, according to other embodiments, the magnets 126 may be fixedly coupled with the stator 120 and the coils 128 may be fixedly coupled with the rotor 122 (e.g., similar to FIGS. 3B and 3D). The coils 128 may be coupled with the rotor 122 in a configuration which may cause a neutralizing force on the rotor 122, where the neutralizing force reduces or eliminates the forces exerted on the rotor 122 from the coils 128 (e.g., the magnitude, size, direction, polarities, and position of each coil of coils 128 may be coupled with the rotor 122 according to other coils of the coils 128, such that the neutralizing force may be caused on the rotor 122 similar to FIGS. 1B-1E). The magnets 126 may be coupled with the stator 120, positioned proximate to the coils 128 such that, when the coils 128 may be driven with an electric current, the coils 128 may be capable of electromagnetically interacting with the magnets 126, coupled with the stator 120, to produce the Lorentz forces that rotate the rotor about the axis 160.

In various embodiments, the magnetic components 126 may comprise of more than four magnets (e.g., similar to the embodiment shown and discussed in detail in FIG. 6A) causing a neutralizing force on the magnetic component arrangement 115. In other embodiments, the magnetic components 126 may comprise of less than four magnets (e.g., such as the embodiment shown in FIG. 1A) causing the neutralizing force on the magnetic component arrangement 115. The magnetic components 126 may comprise of even amounts of magnetic components causing the neutralizing force, where a first half of the even amounts of magnetic components may be configured with opposite magnetic polarities to the other half of the even amounts of magnetic components, reducing the magnetic forces and torques on the magnetic component arrangement 115, causing the neutralizing force.

Although an even number of magnetic components 126 may be used in some embodiments, an odd number of magnetic components 126 (e.g., 3, 5, and/or 9 magnetic components, etc.) may be coupled with the stator 122 and placed to cause a neutralizing force on the magnetic component arrangement 115, reducing and/or eliminating the magnetic forces and magnetic torques exerted from the odd number of magnetic components 126.

Although FIGS. 1C-1E show coils 128 with magnetic polarities radially towards axis 160, in other embodiments, the coils 128 may be coupled with the stator 120 with magnetic polarities of the coils 128 with directions parallel to axis 160 (e.g., the magnetic component arrangements discussed below with regard to FIGS. 3A-3D). The magnets 126 may be coupled with the rotor 122 at a positions which may overlap the coils 128 along an axis parallel to the axis 160, and the magnets 126 may also be coupled with the rotor 122 with magnetic polarities such that, when the coils 128 may be driven with an electric current, the coils 128 may be capable of electromagnetically interacting with the magnets 126_m_, coupled with the stator 120, to produce the Lorentz forces that rotate the rotor about the axis 160.

FIG. 1F illustrates a view of an example variable aperture device 150 with an actuator (e.g., a voice coil motor (VCM) actuator as discussed below in FIG. 2A-2B) causing a neutralizing force on the variable aperture device 150 which may be included in a camera system, according to some embodiments. FIG. 1F shows stator 120, rotor 122, aperture blades 140, aperture stop 130 and optical axis 165 (e.g., may be the same as axis 160 in some embodiments). Although not illustrated in FIG. 1F, the actuator of the variable aperture device 150 may include a first group and second group of magnetic components (e.g., similar to the first and second groups of magnetic components 126 and 128, respectively, as discussed above with regard to FIGS. 1C-1E) which may cause a neutralizing force of the variable aperture device 150, reducing magnetic forces and magnetic torque on the rotor 122.

According to some embodiments, the aperture blades 140 may be coupled to the stator 120 and the rotor 122 in an arrangement to form aperture stop 130. The actuator of the variable aperture device 150 may rotate the rotor 122, relative to the stator 120, moving the aperture blades 140. The movement of the aperture blades 140 by the rotation of the rotor 122 may change an aperture size of the aperture stop 130 (e.g., similar to the rotation of the rotor 122 in FIGS. 1C-1E and similar to the aperture stops 444, 446 and 448 of FIGS. 4A-4C). The aperture stop 130 may function to limit an amount of light that travels along the optical axis 165, through the aperture stop 130 and an opening of the rotor 122.

Figure 4A:
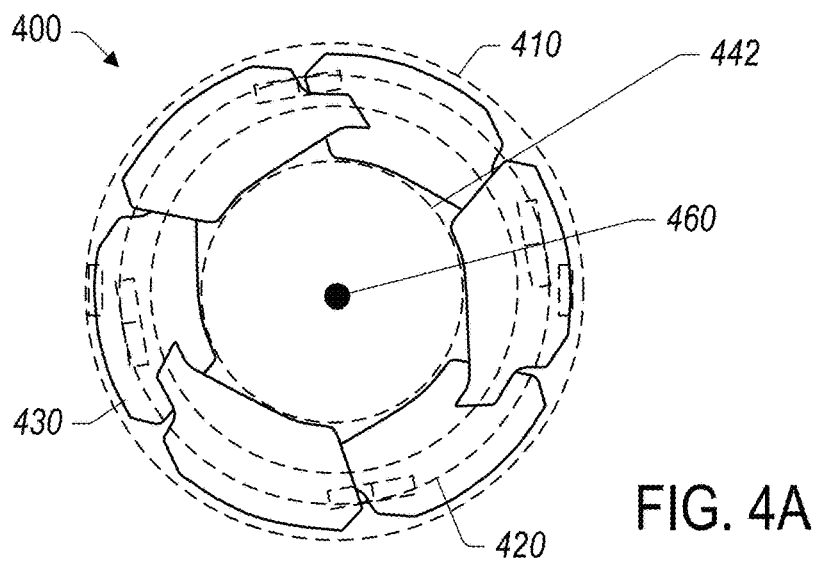
FIGS. 4A-4C illustrate various different aperture stops a variable aperture device may form, where the variable aperture device may include a normalizing force, according to some embodiments.
Figure 4B:
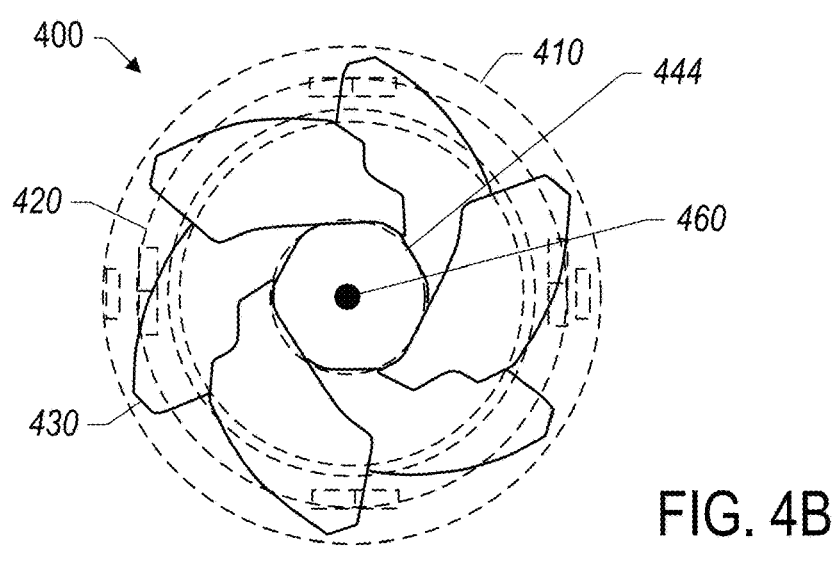
Figure 4C:
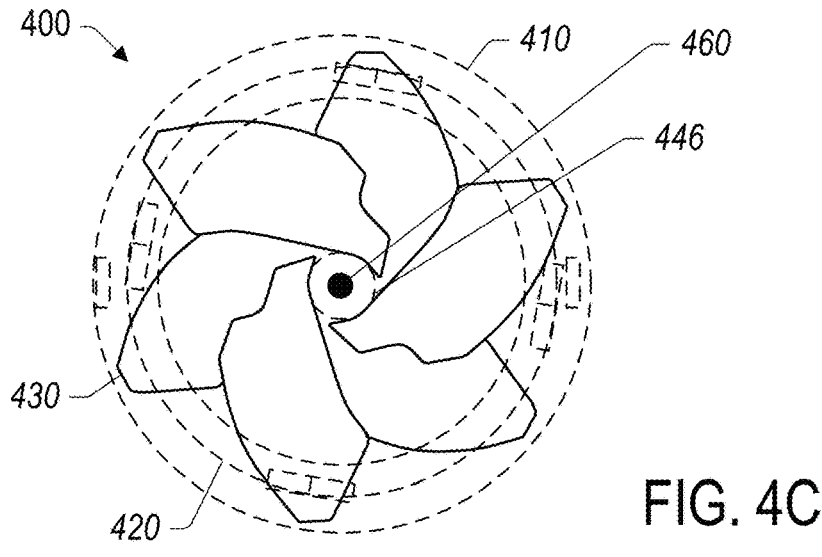
Figure 7:
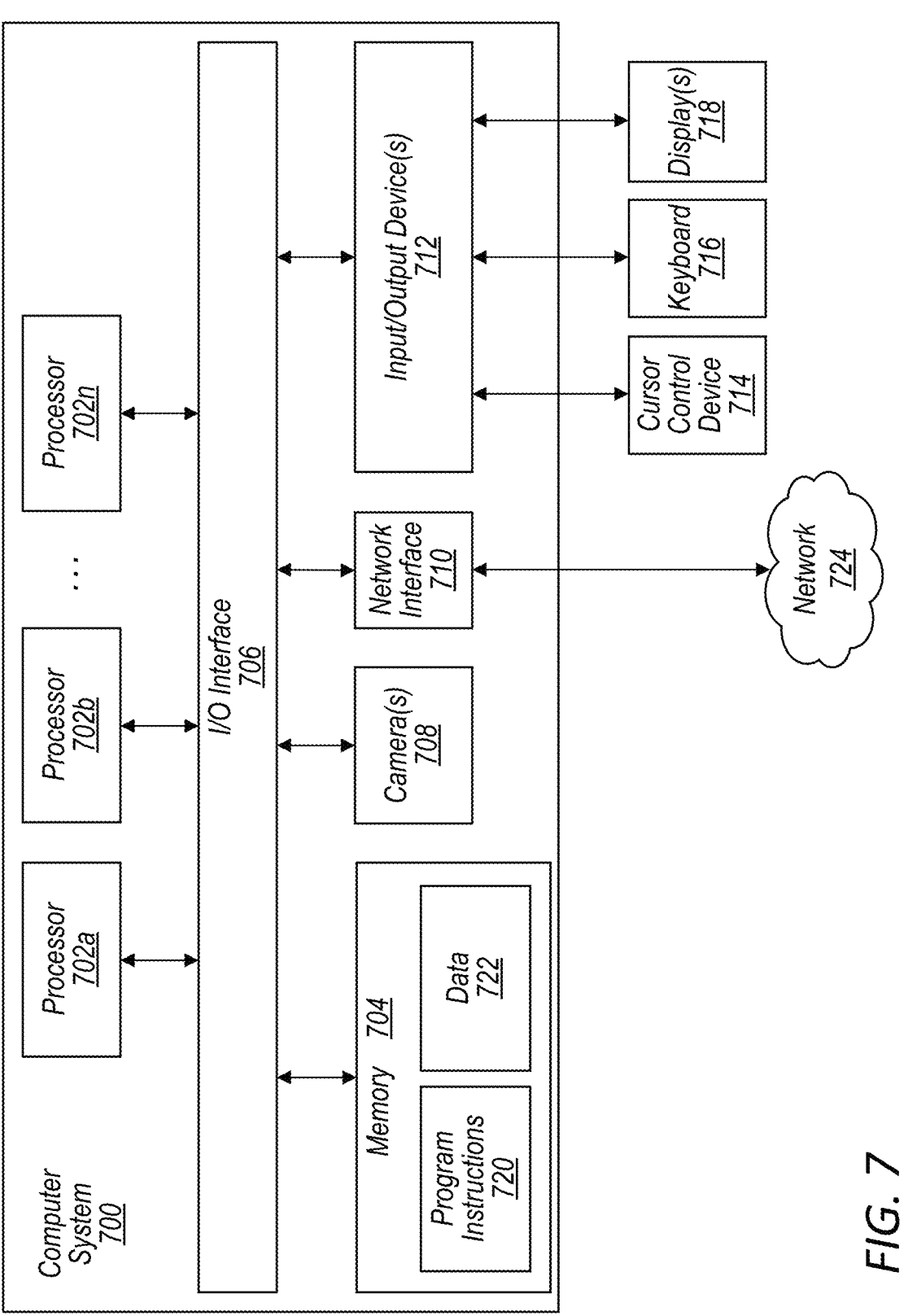
FIG. 7 illustrates a schematic block diagram of an example environment comprising a computer system that may include a camera with a variable aperture device, in accordance with some embodiments.

This Specification continues with various examples of variable aperture devices with neutralizing forces, as well as various examples of components that may be utilized within the various examples of variable aperture devices. FIGS. 2A-2B show exemplary component layouts of variable aperture devices which may be similar to the variable aperture device 150. FIGS. 3A-3C show exemplary embodiments of magnetic components configured to cause neutralizing forces which may be included in actuators of variable aperture devices (e.g., variable aperture device of FIG. 1F, variable aperture devices of FIGS. 2A-2B, etc.). FIGS. 4A-4C show an exemplary embodiment of various different aperture stops that may be formed by a variable aperture device including a neutralizing force. FIGS. 5A-5C show exemplary embodiments of a coil-magnet group that may interact electromagnetically with one another, and the coil-magnet group may be included in an actuator of a variable aperture device. The specification then continues with a method of assembly of a variable aperture device in FIG. 6, and FIG. 7 shows an exemplary computer system which may operate the variable aperture device of FIGS. 1-6.

FIGS. 2A-2B illustrate views of an example variable aperture device with a neutralizing force that may be included in a camera system (e.g., similar to the camera system where embodiments of FIGS. 1A-F may be included), in accordance with some embodiments. FIG. 2A shows an exploded perspective view of the variable aperture device 200 with a first actuator. FIG. 2B shows an exploded perspective view of the variable aperture device 250 with a second actuator.

According to various embodiments, the variable aperture device 200 may include variable aperture blades 230, rotor 220, an actuator (e.g., comprising the magnet arrangement 202 and the coil arrangement 208, stator 210, and optical axis 240. The variable aperture device 200 may include additional components that are not shown in FIGS. 2A-B. For example, the variable aperture device 200 may include components such as, but not limited to, a suspension arrangement (e.g., a ball bearing suspension arrangement comprising ball bearings), sensors, locking mechanism (e.g., comprising metal sheets similar to FIGS. 1C-E), etc.

In some embodiments, the stator 210 may include a base portion, a central portion 328, and an outer protrusion portion (e.g., similar to the cylindrical structure of FIG. 1B). The central portion may extend, in a first direction parallel to an the optical axis 240, from an upper surface of the base portion. The stator 210 may comprise of one or more coil protrusions which may securely lock a coil of the actuator in place. The upper surface of the base portion may extend, in a second direction orthogonal to the optical axis 240, between the central portion and the outer protrusion (e.g., as indicated by FIGS. 2A-2B).

According to some embodiments, the rotor 220 may include a rotor wall. The rotor wall may be positioned, in the second direction orthogonal to the optical axis 240, between the central portion and the outer protrusion portion of the stator.

The stator 210 may include multiple stator coupling components 210, and the rotor 220 may include multiple rotor coupling components 220, according to some embodiments. The aperture blades may comprise of a first coupling components 234 and a second coupling components 232. The aperture blades 230 may be coupled with the stator 210 and the rotor 220 (e.g., similar to the aperture blades 140 of FIG. 1F) with the first coupling components 234 coupling to the stator coupling components 210, and the second coupling components 232 may be coupled with the rotor coupling components 224.

The aperture blades may be arranged to form an aperture stop, e.g., as indicated in FIG. 1F. The variable aperture device 200 may include an actuator (e.g., a voice coil motor (VCM) actuator, etc.) for moving the aperture blades 230 to change the size of the aperture defined by the aperture stop. The aperture stop may function to limit the amount of light that travels along the optical axis 240 through the inner openings of the rotor 220 and the stator 210 (e.g., the variable aperture device 200 may be included in a camera system, and the variable aperture device 200 may limit an amount of light that may reach an image sensor of the camera system). The aperture blades 230 may be movable to change a size of an aperture defined by the aperture stop (e.g., rotation of the rotor 120 by the stator, relative to the stator 110).

According to various embodiments, the actuator may be configured to rotate the rotor 220, relative to the stator 210, about the optical axis 240. For example, the actuator may include a first portion fixedly coupled with the rotor wall (e.g. magnetic components 202), and a second portion fixedly coupled with the outer protrusion portion of the stator 210 (e.g., coil components 208). Rotation of the rotor 308 may cause the aperture blades 310 to move so as to change the size of the aperture (e.g., from the first state in FIG. 2A to the second state in FIG. 2B, vice versa, etc.).

In various embodiments, the actuator may include a voice coil motor (VCM) actuator having magnetic components 202 and coil components 208. The magnetic components 202 be configured to cause a normalizing force similar to FIGS. 1A-1F. The coil components 208 may be positioned proximate the magnet components 202 such that, when driven with an electric current, the coil components 208 are capable of electromagnetically interacting with the magnet components 202 to produce Lorentz forces that rotate the rotor 220 about the optical axis 240, with a normalizing force reducing, or eliminating, magnetic forces and magnetic components exerted on the rotor 220, from the magnetic components 202. As indicated in FIG. 2A, the actuator of the variable aperture device 200 may comprise of a vertical configuration, where the coil components 208 consist of respective magnetic polarities pointing radially towards the optical axis 240, with an orthogonal direction to the path of the optical axis 240. The magnetic components 202 may also be coupled with the rotor 220 as a vertical configuration, where the coil components 202 in vertical configuration may interact electromagnetically with the magnetic components 208 in vertical configuration as well, causing a neutralizing force.

In some embodiments, the magnetic components 202 may be fixedly coupled with the rotor 220. For example, the magnetic components 202 may be fixedly coupled with the rotor wall 220. The coil components 208 may be fixedly coupled with the outer protrusion portion of the stator 210.

In various embodiments, some or all of the VCM components and the structures that support them may overlap in the space they consume in one or more directions orthogonal to the optical axis 240. As discussed herein with reference to FIGS. 1A-1F and FIGS. 3A-3C, in some other embodiments the coil components 202 may be fixedly coupled with the rotor 220, and the magnetic components 208 may be fixedly coupled with the stator 210.

In various embodiments, not illustrated in FIG. 2A, the suspension arrangement of the variable aperture device 200 may be configured to suspend the rotor 220 on the stator 210 and allow the rotor 220 to rotate relative to the stator 210. As previously mentioned, the suspension arrangement may be a ball bearing suspension arrangement in some embodiments. The ball bearing suspension arrangement may be coupled with the rotor 220 and the stator 210, allowing the rotation of the rotor 220 relative to the stator 210.

Although not illustrated, in some embodiments, the variable aperture device 200 may include one or more position sensors that may be used to determine a rotational position of the rotor 220, relative to the stator 210.

According to various embodiments, the magnetic component arrangement 202 configured to cause the neutralizing force on the variable aperture device 200 may comprise of actuator magnets and neutralizing magnets similar to the actuator magnets and neutralizing magnets discussed above with regard to FIGS. 1A-1F. The actuator magnets may be included in magnet-coil groups of the actuator of the variable aperture device 200, where the actuator magnets and coils 208 of the magnet-coil group, may be placed within a proximity of one another to interact electromagnetically with one another as a function of the actuator. The neutralizing magnets may be coupled with the variable aperture device 200 based on magnetic fields and magnetic polarities of the actuator magnets such that, an electromagnetic interaction between the neutralizing magnets and the actuator magnets may cause a neutralizing force, reducing magnetic forces and magnetic fields exerted on the rotor 220 from the actuator magnets. For example, as illustrated in FIG. 2A, the actuator magnets may be a first pair of magnetic components diametrically opposed of one another of the magnetic components 202, and the balancing magnets may be a second pair of diametrically opposed magnetic components of the magnetic components 202 orthogonally opposed to the first pair of magnetic components. Similarly for the magnetic components 252 below with regard to FIG. 2B, where the magnetic components 252 may comprise of actuator magnets and neutralizing magnets configured to interact with one another, causing the neutralizing force.

FIG. 2B shows variable aperture device 250 closely resembling the variable aperture device 200 of FIG. 2A, with a difference of the variable aperture device 250 including an actuator with magnetic polarities orthogonally opposed to magnetic polarities of the actuator of the aperture device 200, according to some embodiments. The magnetic components 252, causing a neutralizing force on the variable aperture device 250, may interact electromagnetically with the coils 258 along a direction parallel to axis 240 (e.g., similar to the magnetic component arrangements of FIGS. 3B-3D, etc.). The neutralizing force of the variable aperture device 250 may be configured such that, the neutralizing force may reduce, or eliminate, magnetic forces and magnetic torques exerted on the rotor 220 along directions orthogonally opposed to the axis 240, and the neutralizing force of magnetic component 250 may exert a force on the rotor 210, parallel to the axis 240 (e.g., magnetic components may be configured to exert forces parallel to the axis 240, or to reduce a force parallel to the axis 240 to a desired magnitude, etc.). The magnetic components 252 may be configured such that, the neutralizing force may exert a force on the rotor 220, parallel to the axis 240, towards the stator 210. A force exerted on the rotor 220 towards the stator 210 may be beneficial in some embodiments, providing a force which may retain the rotor 220 and the stator 210 in place. According to other embodiments, magnetic components 252 may be configured such that, the neutralizing force may exert a force on the rotor 220, parallel to the axis 240, towards a direction opposite to the stator 210. A force exerted on the rotor 220 opposite of the stator may be beneficial in some embodiments, providing a force which may reduce mechanical interactions between the rotor 220 and the stator 210 (e.g., the rotor 220 may rotate relative to the stator 210 with a lesser amount of friction between both, etc.).

FIGS. 3A-D illustrate various examples of different magnetic components that may be configured to cause neutralizing forces (e.g., similar to the neutralizing forces as discussed with regard to FIGS. 1A-1F), according to some embodiments. FIG. 3A shows a first magnetic component arrangement 300 comprising of magnets 304A-B and 308A-B (e.g., bipolar magnets as discussed in detail below with regard to FIGS. tA-5B) with magnetic polarities orthogonally opposed to an axis 310, and radially along towards the axis 310, and the magnets 304A-B and 308A-B are configured to cause a neutralizing force (e.g., similar to the neutralizing forces of FIGS. 1A-1F and 2A-2B). FIG. 3B shows a second magnetic component arrangement 320 comprising of coils 324A-B and 328A-B (e.g., etched coils as discussed in detail below with regard to FIGS. 5A-5B, etc.) with magnetic polarities orthogonally opposed to an axis 310, and radially along towards the axis 310, and the coils 324A-B and 328A-B are configured to cause a neutralizing force (e.g., like magnets 304A-B and 308A-B of magnetic component arrangement 300 mentioned above, etc.). FIG. 3C shows a third magnetic component arrangement 340 similar to the first magnetic component arrangement 300, with a difference of magnets 304A-B and 308A-B having magnetic polarities parallel to an axis 310. FIG. 3D shows a fourth magnetic component arrangement 360 similar to the second magnetic component arrangement 320, with a difference of coils 364A-B and 368A-B having magnetic polarities parallel to an axis 310 (e.g., similar to the magnetic polarities of the magnetic component arrangement 340 above in FIG. 3C, etc.).

In some embodiments, the magnetic component arrangements 300, 320, 340 and 360 may be included in an actuator of a variable aperture device (e.g., variable aperture device 150 of FIG. 1F, variable aperture devices 200 and 250 of FIGS. 2A-2B respectively, variable aperture device 400 of FIGS. 4A-4C, etc.). For example, although not illustrated, the magnetic component arrangements 300, 320, 340 and 360 may each be coupled with a rotor and configured to cause a neutralizing force on each respective rotor, according to some embodiments. The magnetic component arrangements 300, 320, 340 and 360 may each include a first and second groups of magnetic components with opposite magnetic polarities relative to each one of the groups (e.g., the first and second groups of magnetic components of FIGS. 1A-1B, and 2A-2B, etc.). The opposite magnetic polarities of the first and second groups may cause a neutralizing force within each magnetic component arrangement 300, 320, 340 and 360, reducing or eliminating magnetic forces and magnetic torques exerted on each of the rotors exerted from each respective magnetic component arrangements 300, 320, 340 and 360. The rotor for each magnetic component arrangement 300, 320, 340 and 360 may be included within variable aperture devices to cause the neutralizing forces on the variable aperture devices.

Although not illustrated, a second group of magnetic components may be positioned proximate to one or more magnetic components of FIGS. 3A-3B to interact electromagnetically with the one or more magnetic components of FIGS. 3A-3B (e.g., similar to the magnetic components 126 and 128 interacting electromagnetically with each other in FIG. 1B, etc.). For example, in FIG. 1A, the second group of magnetic components may include one or more coils that may be proximate to one or more of the magnets 324A-B and 328A-B, and the one or more coils may have magnetic polarities. FIG. 3B, shows a similar magnetic component arrangement 320 to magnetic component arrangement 300, with a difference that the magnetic components 324A-B and 328A-B are coils rather than magnets. FIG. 3D shows a similar magnetic component arrangement 360 to magnetic component arrangement 300, with a difference of magnetic components 344A-B and 344A-C having magnetic polarities parallel to the axis 310, similar to the magnetic component arrangement 360.

According to various embodiments, the magnetic components of magnetic component arrangements 300 and 340 may comprise of actuator magnets and balancing magnets, as discussed above with regard to the actuator magnets and balancing magnets of FIGS. 1A-1F. For example, as illustrated in FIG. 3A, the magnetic components 308A-B may be actuator magnets 308A-B configured to interact electromagnetically with coils positioned proximate to the actuator magnets 308A-B (e.g., as part of an actuator, such as a voice coil motor (VCM) actuator, etc.), and the magnetic components 304A-B may be neutralizing magnets 304A-B. The neutralizing magnets 304A-B may be positioned proximate to actuator magnets 308A-B such that, the neutralizing magnets 304A-B may interact electromagnetically with the magnetic fields and the magnetic polarities of the actuator magnets 308A-B, causing a neutralizing force which may reduce or eliminate magnetic forces and magnetic torques, on the magnetic component arrangement 300, from the actuator magnets 308A-B. In other embodiments, the magnetic components 108A-B may be the neutralizing magnets, and the magnetic components 104A-B may be the actuator magnets. Similarly, the magnetic components 364A-B and 368A-B may either be the actuator magnets or the neutralizing magnets, configured to cause a neutralizing force on the magnetic component arrangement 340, reducing magnetic forces and magnetic torques on the magnetic component arrangement 340 exerted from the actuator magnets of the magnetic component arrangement 340.

This Specification continues with examples of a variable aperture device forming various different aperture openings, and which may include variable aperture device components as discussed in detail with regard to FIGS. 1A-1F, 2A-2B and 3A-3D, according to some embodiments.

FIGS. 4A-4C illustrate various different aperture stops a variable aperture device may form, where the variable aperture device may include a normalizing force, according to some embodiments. FIG. 4A shows a variable aperture device 400 including aperture blades 430 forming a first aperture stop (referred to herein as "aperture stop 400A"). FIG. 4B shows the variable aperture device 400 forming a second aperture stop (referred to herein as "aperture stop 400B") with the aperture blades 430. FIG. 4C shows the variable aperture device 400 forming a third aperture stop (referred to herein as "aperture stop 400C") with the aperture blades 430.

In some embodiments, the variable aperture device 400 may include a stator 410 (e.g., such as the stators discussed in FIGS. 1C-1F, 2A-2B, and 6B), a rotor 420 (e.g., such as the rotors discussed in FIGS. 1B-1F, 2A-2B, and 6B), aperture blades 430 (e.g., such as the aperture blades discussed in FIGS. 1F and 2A-2B) coupled to the stator 410 and the rotor 420, an axis 460 (e.g., such as the axes 160 from FIGS. 1B-1E, and/or the optical axes 140 and 240 from FIGS. 1F and 2A-2B respectively) centered within the rotor 420. Although not illustrated, the variable aperture device 400 may also include an actuator (e.g. the actuators of FIGS. 1C-1F, the actuators of FIGS. 2A-2B, a voice coil motor (VCM), etc.) which may rotate the rotor 420 about the axis 460, relative to the stator 410. The actuator may include various groups of magnetic components where one of the groups of magnetic components may cause a neutralizing force on the variable aperture device 400.

Such as the actuator discussed in detail with regard to FIGS. 1C-1E, the actuator of the variable aperture device 400 may be similar and may rotate the rotor 420 about the axis 460, relative to the stator 410, moving the coupled aperture blades 430 and changing the aperture stop formed by the aperture blades 430, according to some embodiments. The aperture stops 400A-400C may be formed by the aperture blades 430 by rotating the rotor 420 at different radial positions about the axis 460, relative to the stator 410.

In some embodiments, the aperture stop 400A may be an aperture stop formed by the aperture blades 430 when the actuator of the variable aperture device 400 is not receiving power (e.g., the actuator is off). The aperture stop 400B may be an aperture stop of a smaller aperture than aperture stop 400A, and may be the aperture stop formed by the aperture blades 430 when a first threshold amount of power is applied to the actuator. A second threshold amount of power may be applied to the actuator, rotating the rotor 420 and forming the aperture stop 400C with the aperture blades 430, where the aperture stop 400C may be an aperture stop of a smaller aperture than the aperture stop 400B. In other embodiments, the aperture stop 400C may be the aperture stop of the variable aperture device 400 when the actuator is not receiving power, and the aperture stops 400B and 400A may be subsequent apertures formed by delivering a first and second threshold amounts of power to the actuator, respectively. In other embodiments, aperture stop 400B may be the aperture stop formed by the aperture blades 430 when the actuator is not receiving power, aperture stop 400A may be an aperture formed by the aperture blades 430 when the actuator receives the first threshold amount of power, and the aperture stop 400C may be an aperture formed by the aperture blades 430 when the actuator receives an inverse threshold amount of power to the first threshold amount of power. Those skilled in the art will appreciate that, although FIGS. 4A-4C show three different aperture stops, the three different aperture stops are not meant to be limiting, and combinations of more than three aperture stops may be configured within a variable aperture device as described within this Specification.

Similar to the neutralizing force caused by magnetic components discussed in detail above in regard to FIGS. 1A-1F, 2A-2B, and 3A-3D, the actuator of the variable aperture device 400 may cause a neutralizing force on the variable aperture device 400. The neutralizing force may reduce or eliminate magnetic forces and magnetic torque exerted on the rotor 420 from magnetic components of the actuator. For example, magnetic forces and magnetic torques may be exerted on the rotor 420 if the actuator receives a threshold amount of power, causing possible unintended movements of the rotor 420 due to the magnetic forces and the magnetic torques exerted on the rotor 420. The neutralizing force may reduce or eliminate such magnetic forces and magnetic torques on the rotor 420 and may allow the rotor 420 to rotate about the axis 460, relative to the stator 410, without the unwanted movements. Furthermore, the actuator of the variable aperture device 400 may require a lesser amount to retain in place the rotor 420, relative to the stator 410, at the various different aperture stops 400A-C.

In other embodiments, the neutralizing force of the variable aperture device 400 may reduce or eliminate magnetic forces and magnetic torque exerted on the rotor 420 orthogonally opposed to the axis 460, and the neutralizing force may exert an intentional force on the rotor 420 parallel to the axis 460 (e.g., similar to the neutralizing force causing a force parallel to the axis 240 in FIGS. 2A-2B, etc.). Magnets of the actuator that cause the neutralizing force may be configured such that the resulting neutralizing force causes the intentional force on the rotor 420 parallel to the axis 460. In some embodiments, the intentional force may be exerted on the rotor 420 along a first direction parallel to the axis 460, and in other embodiments, the intentional force may be exerted on the rotor 420 along a second and opposite direction parallel to axis 460.

The variable aperture device 400 may be included in a camera system and the variable aperture device may be configured to provide a variable aperture for the camera system, according to some embodiments. The variable aperture device 400 may provide the camera system with various apertures such as aperture stop 400A-C as discussed in detail above. The aperture stops 400A-C may function to limit an amount of light that reaches an image sensor of the camera system via the aperture formed by the aperture blades 430. A computer system may operate the variable aperture device 400 (e.g., computer system 700 of FIG. 7), providing threshold amounts of power to the actuator to rotate the rotor 420 about the axis 460, relative to the stator 410, to form the various aperture stops 400A-C.

The actuator of the variable aperture device 400 may include a first and second groups of magnetic components positioned proximate of each other, and interacting electromagnetically with one another to operate the actuator, rotating the rotor 420 about axis 460 relative to the stator 410, according to some embodiments. This Specification continues with examples of magnet-coil groups interacting electromagnetically with one another, and the magnet-coil groups may be a combination of the first and second magnetic groups as discussed above with regard to FIGS. 1A-1F, 2A-2B, 3A-3D and 4A-4C.

Figure 5A:
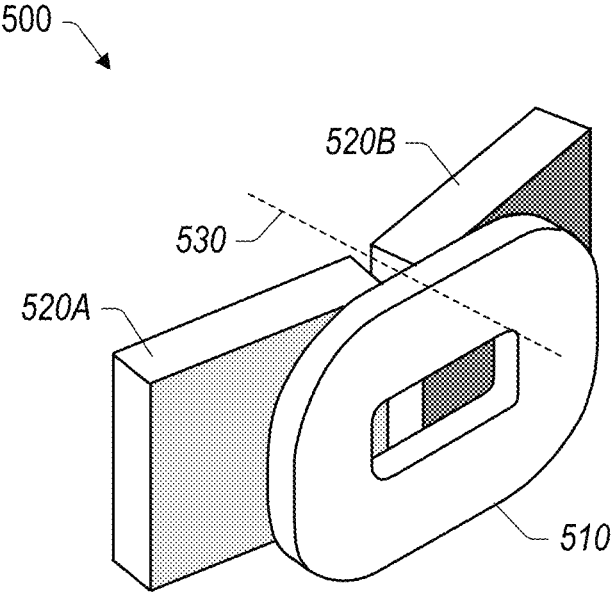
FIGS. 5A-5B illustrate views of respective example electromagnetic arrangements that may be used in an actuator of a variable aperture device, in accordance with some embodiments.
Figure 5B:
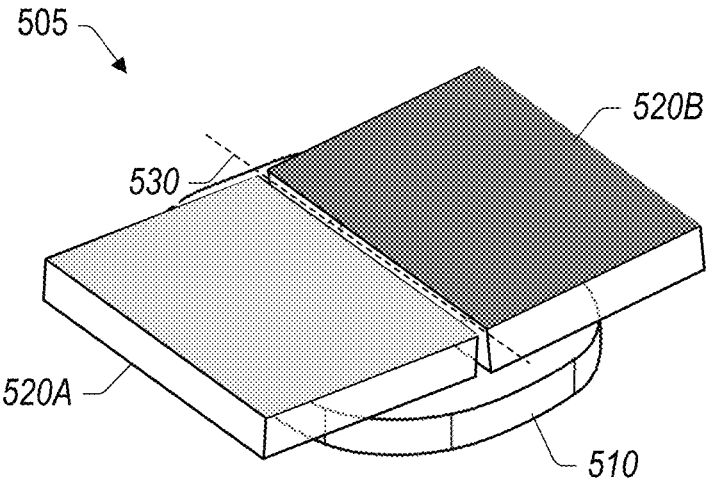

FIGS. 5A-5B illustrate views of respective example electromagnetic arrangements that may be used in an actuator of a variable aperture device (e.g., variable aperture device 150 in FIG. 1, variable aperture devices 200 and 250 in FIGS. 2A-2B, and variable aperture device 400 in FIGS. 4A-4C, etc.), in accordance with some embodiments. FIG. 4A shows a perspective view of an electromagnetic arrangement 500 with magnetic polarities parallel to an axis 530 that includes a dual-pole magnet 520 in a magnet-coil group with a single coil 510. FIG. 4B shows a similar embodiment to FIG. 4A, differing with magnetic polarities of the magnetic components of the electromagnetic arrangement 500 being orthogonally opposed to the axis 530.

As indicated in FIG. 5A, the magnet-coil group in the electromagnetic arrangement 500 may include a dual-pole magnet arrangement 520 and a coil 510. In some embodiments, the dual-pole magnet arrangement 520 may comprise two single-pole magnets (e.g., single-pole magnet 520A and single-pole magnet 520B) positioned near one another with opposite polarity directions facing the coil 510, e.g., as indicated in FIG. 5A. In the non-limiting examples of the magnet arrangement shown in the figures, the relatively lighter shade (e.g., the shade on the face of magnet 520B facing the coil 510) indicates a first polarity direction (e.g., north or south, or positive and negative), and the relatively darker shade (e.g., the shade on the face of magnet 520A) facing the coil 510 indicates a second polarity direction (e.g., north or south, or positive and negative) that is opposite/the reverse of the first polarity direction. In some embodiments, the dual-pole magnet arrangement 500 may comprise a dual-pole magnet formed by coupling two single-pole magnets (e.g., single-pole magnet 520A and single-pole magnet 520B) with a non-magnetic material placed between them (e.g., as illustrated in FIG. 5B), the combination being joined to form a single-piece dual-pole magnet.

According to some embodiments, as shown in FIG. 5A, the coil 510 may be oriented such that it has a longest dimension in a direction that is orthogonal to an optical axis (e.g., axis 165 in FIG. 1). In various embodiments, a central portion of the dual-pole magnet arrangement 500 may be aligned with a central portion of the coil 510, e.g., as indicated by the axis 530 intersecting a central portion of the dual-pole magnet arrangement 500 and a central portion of the coil 510. In other embodiments, as shown in FIG. 5B, the coil 510 may be oriented such that it has the longest dimension in a direction that is parallel to the optical axis (e.g., the variable aperture device 250 of FIG. 2B, the magnetic component arrangement 340 and 360, etc.).

According to various embodiments, the magnetic component 520, of FIGS. 5A and 5B, may be an actuator magnet configured to interact electromagnetically with each respective coil 510 of FIGS. 5A and 5B. Although not illustrated, a neutralizing magnet may be positioned proximate to the actuator magnet 520 to cause a neutralizing force, reducing or eliminating magnetic torques and magnetic forces exerted by the actuator magnet 520 (e.g., similar to the actuator magnets and the neutralizing magnets of FIGS. 1A-1F, etc.).

In some embodiments, the coils in the electromagnetic arrangement 500 may include etched coils. The process of etching a coil may include selectively removing portions of a conductive material (e.g., copper) on a substrate to create a coil structure. This is typically accomplished using an etching technique, and a masking pattern may be employed to define the areas where the conductive material will be preserved and the areas that will be etched away. Additionally, or alternatively, the coils may include wound coils.

FIG. 6 is a flowchart that illustrates an example method 600 of assembling a variable aperture device (e.g., the variable aperture device 150 in FIG. 1F, the variable aperture devices 200 and 250 of FIGS. 2A and 2B respectively, the variable aperture device 400 of FIGS. 4A-4C, etc.) including an actuator causing a neutralizing force (e.g., the actuator as discussed in FIGS. 1C-1F, etc.), according with some embodiments. It should be understood that, in some embodiments, the order of operations of blocks 610-629 may be different than indicated in FIG. 6 via the block numerals and/or the flowchart arrows. Additionally, or alternatively, the method 600 may include fewer or more operations than those indicated by blocks 610-629.

At 610, the method 600 may include coupling aperture blades forming an aperture stop with a rotor and a stator (e.g., aperture blades 140, rotor 122 and stator 120, respectively, of FIG. 1F, etc.), according to some embodiments. The rotor may rotate about an axis concentric with the rotor and the stator, relative to the stator. Coupling the aperture blades to the rotor and the stator may include fixedly attaching the aperture blades to the rotor which may allow for changing a size of an aperture defined by the aperture stop.

At 614, the method 600 may include attaching first coupling features of the aperture blades with coupling features of the rotor, according to some embodiments. In some embodiments, the first coupling features of the aperture blades and the coupling features of the rotor may arbitrarily comprise of at least a group of pins and a group of holes (e.g., coupling features 214, 224, 230 and 234 of FIGS. 2A-2B, etc.), where the group of pins and the group of holes may connect and interface together, allowing for movement of the aperture blades (e.g., the rotor may include pins which may connect a hole/openings of each respective aperture blade of the aperture blades, similarly the rotor may include holes/openings which may connect with pins of the aperture blades, or may be a combination of both pin and holes in the rotor connecting with holes and pins of the aperture blades, etc.). As one skilled in the art will appreciate, there may be multiple coupling features which may allow for movement of the aperture blades causing a size of the aperture formed by the aperture stop to change which may be utilized with the techniques and embodiments disclosed herein. The examples recited above are not meant to be limiting, and combinations of different coupling features allowing movement of the aperture blades may be included within a variable aperture device as described within this Specification.

In various embodiments, the first coupling features of the aperture blades may comprise of slotted openings which may extend across a surface of each respective aperture blade of the aperture blades. The slotted openings may connect and interface with coupling features of the rotor (e.g., pins as mentioned above, etc.), and the coupling features of the rotor may be configured to move along openings of the slotted holes during rotational movement of the rotor, moving the aperture blades and changing the size of the aperture.

At 618, the method 600 may include attaching second coupling features of the aperture blades with coupling features of the stator, according to some embodiments. The second coupling features of the aperture blades and the coupling features of the stator include similar coupling features to the first coupling features of the aperture blades and the coupling features of the rotor (e.g., 614, etc.). Attaching the second coupling features to the coupling features of the stator may involve connecting both components configured to allow movement of the aperture blades. Similarly, multiple combinations of different coupling features allowing movement of the aperture blades may be included as the second coupling features and the coupling features of the stator.

At 620, the method 600 may include coupling an actuator (e.g., a voice coil motor (VCM) actuator as discussed with regard to FIGS. 1A-1F, 2A-2B, etc.) comprising at least three groups of magnetic components configured to cause a neutralizing force (e.g., magnetic components 126 and 128 of FIGS. 1C-1E, etc.), with the rotor and the stator, according to some embodiments. A first and second groups of magnetic components of the actuator may be coupled with the rotor with a configuration to cause a neutralizing force on the rotor as mentioned above. A third group of magnetic components of the actuator may be coupled with the stator and configured to interact electromagnetically with the first and/or second groups of magnetic components to produce Lorentz forces that rotate the rotor about the concentric axis relative to the stator.

At 623, the method 600 may include fixedly attaching the first group of one or more magnetic components of the actuator to the rotor, according to some embodiments. The first group of magnetic components may include one or more magnetic components, and the first group of magnetic components may be fixedly attached to the rotor with first magnetic polarities relative to the concentric axis (e.g., the magnetic components have equal, or very similar, magnitudes and directions of the magnetic polarities relative to the concentric axis, etc.). In various embodiments, the one or more magnetic components of the first group may be coupled with the rotor based on the one or more magnetic components of the first group such that, each first magnetic polarity of the first magnetic polarities may be radially symmetric with respect to the concentric axis (e.g., magnetic components 104A-B and 108A-B of FIG. 1B, etc.).

At 626, the method 600 may include fixedly attaching the second group of one or more magnetic components of the actuator to the rotor, according to some embodiments. The second group of magnetic components may include one or more magnetic components. In other embodiments, the one or more magnetic components may include an equal amount of magnetic components as the first group of magnetic components. The second group of magnetic components may be attached to the rotor similarly to the first group of magnetic components, causing second magnetic polarities relative to the concentric axis, where the second magnetic polarities may be of equal, or similar magnitudes to one another, and radially symmetric with respect to the concentric axis (e.g., similar attachment as the first group of magnetic component causing the first magnetic polarities, etc.). Differing from the first group of magnetic components, the second group of magnetic components may be attached to the rotor based on the first magnetic polarities of the first group of magnetic components. The second magnetic polarities may comprise of inverse magnetic polarities compared to the first magnetic polarities with respect to the concentric axis, and the second magnetic polarities may also comprise of equal, or similar magnitudes as the first magnetic polarities, such that, the first and second magnetic polarities may interact, causing the neutralizing force. The neutralizing force may be caused from the interaction of the opposite magnetic polarities of the first and second groups with similar magnitudes. The neutralizing force may reduce, or eliminate, magnetic forces and magnetic torques exerted on the rotor from the first and second magnetic polarities of the first and second groups of magnetic components.

At 629, the method 600 may include fixedly attaching a third group of one or more magnetic components of the actuator to the stator (e.g., magnetic components 128 of FIG. 1C-E, magnetic component 510 of FIG. 5B, etc.), according to some embodiments. Attaching the third group of magnetic components may include individually attaching the one or more magnetic components of the third group proximate to respective one or more magnetic components of the first group and/or the second group of magnetic components such that, the one or more magnetic components of the third group may interact electromagnetically with the respective one or more magnetic components of the first group and/or the second group, causing the Lorentz forces that rotate the rotor about the concentric axis relative to the stator (e.g., magnet-coil groups 500 and 505 of FIGS. 5A and 5B respectively, etc.).

According to some embodiments, the actuator may include one or more magnet-coil groups (e.g., magnet-coil groups of FIGS. 5A-5B, etc.) configured to generate the Lorentz forces that rotate the rotor about the concentric axis, relative to the stator. The magnet-coil groups may comprise of first and second groups of magnets (e.g., bipolar magnets as discussed in FIG. 5, etc.), and a third group of coils (e.g., wound coils and/or etched coils as discussed in FIG. 5, etc.). In some embodiments, the first and second groups of magnets may be fixedly attached to the rotor and configured to cause a neutralizing force on the rotor (e.g., 623 and 626, etc.), and the third group of magnetic coils may be attached to the rotor and positioned proximate to magnets of the first and/or second group of magnets (e.g., as discussed above at 629, etc.). A threshold amount of power may be delivered to the third group of coils (e.g., computer system 700 of FIG. 7 may control the variable aperture device of method 600 and may deliver the threshold amount of power to the magnet-coil groups, etc.) causing the third group of coils to interact electromagnetically with the magnets of the first and/or second groups proximate to one or more of the coils, generating the Lorentz forces that rotate the rotor about the concentric axis, relative to the stator. The rotor may rotate about the stator with the first and second groups of magnetic components attached to the rotor and causing the neutralizing force, reducing magnetic forces and magnetic torques of the rotor during rotation of the rotor. In various other embodiments, the third group of coils may be coupled with the rotor, and the first and second groups of magnets may be attached with the stator and configured to interact among the first and second groups, causing the neutralizing force on the rotor reducing magnetic forces and magnetic torques exerted on the rotor from first and second groups of magnets.

In various embodiments, the magnets of the actuator may include bi-polar attached to the rotor or the stator and configured to cause the neutralizing force on the rotor (e.g., magnetic component arrangements 300 and 340 of FIGS. 3A and 3C respectively, etc.). The bi-polar magnets may be configured to interact electromagnetically with coils (e.g., of a magnet-coil group, etc.), generating Lorentz forces between the bi-polar magnets and the coils when a first threshold amount of power is delivered to the coils. Providing a second threshold amount of power with inverse electrical direction with regard to the first threshold amount of power (e.g., coils receive the threshold amount of power at different ends of the coil, etc.) to the coil may cause for the magnet-coil groups to interact electromagnetically inversely to the electromagnetic interaction caused by the first threshold amount of power, generating Lorentz forces that rotate the rotor about the concentric axis, about the stator, along a radial direction opposite to the rotation of the rotor from the first threshold amount of power. In various other embodiments, the magnets of the actuator may comprise of two single-pole magnets positioned near one another and with opposite polarities relative to one another, forming dual-pole magnets (e.g., the bi-polar magnets discussed above in this paragraph, etc.).

According to some embodiments, the coils of the magnet-coil groups attached to the rotor or the stator may include wound coils (e.g. wound coils discussed in FIGS. 5A-5B, etc.). The wound coils may be attached to the rotor or the stator with one or more coupling structures of the rotor or the stator that allow fixedly placing the wound coils with the rotor or the stator. For example, the rotor or the stator, may include one or more protruding structures which may mount the wound coils. In other embodiments, the coils of the magnet-coil groups may include etched coils (e.g., etched coils discussed in FIGS. 5A-5B, etc.), and the etched coils may be fixedly attached to the rotor or the stator with respective protruding structures of the rotor or the stator which may mount the etched coils. In some embodiments, a combination of wound coils and etched coils may be employed in conjunction with each other, where the actuators may include etched and wound coils configured to interact electromagnetically with magnets (e.g., bi-polar magnets, etc.) to generate the Lorentz forces that rotate the rotor about the concentric axis, relative to the stator.

According to some embodiments, the magnet-coil groups of the actuator may be coupled with the rotor and the stator according to magnetic polarities of coils of the magnet-coil groups, in relation with the concentric axis. For example, in some embodiments, the coils of the magnet-coil groups (e.g., the third group of magnetic components as discussed above) may be attached to the rotor, or the stator, such that a longest dimension of each coil may be oriented orthogonal to a trajectory of the concentric axis (e.g., variable aperture device 250 of FIG. 2B, etc.), and the coils of the magnet-coil groups may generate electric polarities with orientations parallel to the concentric axis. Magnets of the actuator (e.g., magnets includes may include the first and second groups of magnetic components as discussed above, etc.) may be attached to the other one of the rotor or the stator not including the coils of the magnet-groups, the magnets may be configured to cause a neutralizing force on the rotor reducing magnetic forces and magnetic torque exerted on the rotor from the magnets of the actuator (e.g., similar to the neutralizing force in 623 and 626, etc.), the magnets may be attached to the rotor or the stator with magnetic polarities with orientations according to the magnetic polarities of the coils such that the magnetic polarities of the coils and at least one or more of the magnets may interact electromagnetically, the at least one or more of the magnets may be attached proximate to the coils of the magnet-coil groups along a direction parallel to the concentric axis, forming the individual ones of the magnet-coil groups. The magnets and the coils, of the magnet-coil groups, proximate to one another may interact, generating the Lorentz forces that may rotate the rotor about the concentric axis, relative to the stator. In other embodiments, the coils of the magnet-coil groups may be attached to the rotor or the stator such that the longest dimension of each coil may be oriented towards the concentric axis (e.g., variable aperture device 200 of FIG. 2A, etc.), orthogonally perpendicular with the concentric axis, and the coils may generate magnetic polarities with orientations towards the concentric axis (e.g., north or south towards the concentric axis, etc.). The magnets of the actuator may be attached with the other one of the rotor or the stator not including the coils of the magnet-coil groups, the magnets may be configured to cause the neutralizing force on the rotor reducing the magnetic forces and magnetic torques exerted on the rotor from the magnets, the magnets may be attached to the rotor or the stator with orientations such that one or more of the magnets may be proximate to one or more of the coils and with respective magnetic polarities relative to the magnetic polarities of the coils directed towards the concentric axis, interacting electromagnetically and generating the Lorentz forces that rotate the rotor about the concentric axis, relative to the stator.

According to some embodiments, the variable aperture device of method 600 may be further coupled with a camera system, where aperture blades of the variable aperture device may form an aperture for the camera system which may limit an amount of light that can pass through the variable aperture device to one or more lenses of the camera system. A threshold amount of power may be delivered to an actuator (e.g., voice coil motor (VCM) actuator, etc.) of the variable aperture device to rotate a rotor of the variable aperture device about an axis concentric with the rotor and parallel with an optical axis of the camera system, relative to a stator of the variable aperture device. One or more magnetic components of the actuator may be attached to the variable aperture device and configured to cause a neutralizing force on the rotor, reducing magnetic forces and magnetic torques on the rotor exerted from the one or more magnetic components of the actuator. When the threshold amount of power is provided to the actuator, the rotor may rotate about the axis, relative to the actuator, with the neutralizing force reducing magnetic forces and magnetic torque on the rotor (e.g., neutralizing force as discussed in FIGS. 1A-1F, etc.).

FIG. 7 illustrates a schematic block diagram of an example environment comprising a computer system 700 that may include a camera with a variable aperture device, e.g., as described herein with reference to FIGS. 1-5. In addition, computer system 700 may implement methods for controlling operations of the camera and/or for performing image processing on images captured with the camera.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, set top box, a mobile device, an augmented reality (AS) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instructions set architectures (ISAs), such as the x86, PowerPC, SPARC, or MIPS ISAs, or any other suitable ISA. In multiprocessor systems, each of processors 702 may be commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent, or stored upon different types of computer-accessible media or on similar media separate from system memory 704. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing, or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory704, may be incorporated directly into processors 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicate4d functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical system, comprising:

a stator;

a rotor;

aperture blades arranged to form an aperture stop, wherein the aperture blades are coupled with the stator and the rotor, and wherein the aperture blades are movable to change a size of an aperture defined by the aperture stop;

an actuator for rotating the rotor, relative to the stator, about an axis that is parallel to an optical axis of the optical system, wherein the actuator comprises two or more actuator magnets coupled with the stator or the rotor;

two or more neutralizing magnets, wherein the two or more neutralizing magnets are positioned with respect to the two or more actuator magnets to cause a neutralizing force on the rotor based on respective magnetic fields and magnetic polarities of the two or more actuator magnets, wherein the neutralizing force reduces torque and forces exerted on the rotor by the magnetic fields and the magnetic forces from the two or more actuator magnets; and wherein the optical system is operable such that:

when a threshold amount of power is supplied to the actuator, a rotational force produced by the actuator is sufficient to rotate the rotor, relative to the stator, about the axis, to change the aperture size, wherein the rotational force produced by the actuator is reduced at least based on the neutralizing force.

2. The optical system of claim 1, wherein:

the actuator comprises a voice coil motor (VCM) actuator, and wherein the VCM actuator comprises:

the two or more actuator magnets coupled with the rotor;

one or more coils coupled with the stator proximate one or more of the at least two actuator magnets such that, when driven with an electric current, the one or more coils are capable of electromagnetically interacting with the two or more actuator magnets to produce Lorentz forces that rotate the rotor about the axis parallel to the optical axis, and wherein a number of the one or more coils coupled with the stator is determined based on the number of two or more actuator magnets; and the two or more neutralizing magnets coupled with the rotor, causing the neutralizing force to reduce magnetic forces and torque exerted on the rotor from the two or more actuator magnets coupled with the rotor.

3. The optical system of claim 1, wherein:

the actuator comprises a voice coil motor (VCM) actuator, and wherein the VCM actuator comprises:

the two or more actuator magnets coupled with the stator;

one or more coils coupled with the rotor proximate to one or more of the at least two actuator magnets such that, when driven with an electric current, the one or more coils are capable of electromagnetically interacting with the two or more actuator magnets to produce Lorentz forces that rotate the rotor about the axis parallel to the optical axis, and wherein a number of the one or more coils coupled with the rotor is determined based on the number of two or more actuator magnets; and the two or more neutralizing magnets coupled with the stator, causing the neutralizing force to reduce magnetic forces and torque exerted on the rotor from the two or more actuator magnets coupled with the stator.

4. The optical system of claim 2, wherein a number of magnets of the neutralizing magnets is equal to a number of magnets of the actuator magnets.

5. The systems of claim 2, wherein the neutralizing magnets and the actuator magnets are dual-pole magnets.

6. The optical system of claim 2, wherein the voice coil motor (VCM) actuator further comprises:

coupling the one or more coils with the stator with a longest dimension of the one or more coils facing towards the axis parallel to the optical axis of the optical system, orthogonally perpendicular to the axis parallel to the optical axis; and coupling the two or more actuator magnets with the rotor with respective magnetic polarities of the at least two actuator magnets according to magnetic polarities of the respective one or more coils such that, when driven with an electric current, the one or more coils are capable of electromagnetically interacting with the at least two actuator magnets; and coupling the two or more neutralizing magnets with the rotor according to the magnetic polarities of the two or actuator magnets such that, the two or more neutralizing magnets interact with the magnetic fields and the magnetic polarities of the two or more actuator magnets, causing the neutralizing force on the rotor.

7. The optical system of claim 1, wherein the two or more neutralizing magnets, further comprise:

being coupled with the rotor or stator, further at least based on, forces and torque exerted on the rotor along the axis, wherein the further coupling of two or more neutralizing magnets with the rotor or stator causes a pre-load reduction force exerted between the rotor and the stator, wherein the pre-load reduction force reduces forces between the rotor and stator.

8. A device, comprising:

one or more processors;

memory storing program instructions executable by the one or more processors to control operations of a camera; and the camera, comprising:

a variable aperture device, comprising:

a stator;

a rotor;

aperture blades arranged to form an aperture stop, wherein the aperture blades are coupled with the stator and the rotor, and wherein the aperture blades are movable to change a size of an aperture defined by the aperture stop;

an actuator for rotating the rotor, relative to the stator, about an axis that is parallel to an optical axis of a camera, wherein the actuator comprises of two or more actuator magnets coupled with the stator or the rotor;

two or more neutralizing magnets, wherein the two or more neutralizing magnets are positioned with respect to the two or more actuator magnets to cause a neutralizing force on the rotor based on respective magnetic fields and magnetic polarities of the two or more actuator magnets, wherein the neutralizing force reduces torque and forces exerted on the rotor by the magnetic fields and the magnetic forces from the two or more actuator magnets; and wherein the variable aperture device is operable such that:

when a threshold amount of power is supplied to the actuator, a rotational force produced by the actuator is sufficient to rotate the rotor, relative to the stator, about the axis, to change the aperture size, wherein the rotational force produced by the actuator is reduced at least based on the neutralizing force.

9. The camera of claim 8, the actuator of the variable aperture device, comprising:

the two or more actuator magnets coupled with the rotor;

one or more coils coupled with the stator proximate to one or more of the at least two actuator magnets such that, when driven with an electric current, the one or more coils are capable of electromagnetically interacting with the one or more actuator magnets to produce Lorentz forces that rotate the rotor about the axis parallel to the optical axis, and wherein a number of the one or more coils coupled with the stator is determined based on the number of two or more actuator magnets; and the two or more neutralizing magnets coupled with the rotor, causing the neutralizing force to reduce magnetic forces and torque exerted on the rotor from the two or more actuator magnets coupled with the rotor.

10. The camera of claim 8, the actuator of the variable aperture device, comprising:

the two or more actuator magnets coupled with the stator;

one or more coils coupled with the rotor proximate to one or more of the at least two actuator magnets such that, when driven with an electric current, the one or more coils are capable of electromagnetically interacting with the one or more actuator magnets to produce Lorentz forces that rotate the rotor about the axis parallel to the optical axis, and wherein a number of the one or more coils coupled with the rotor is determined based on the number of two or more actuator magnets; and the two or more neutralizing magnets coupled with the stator, causing the neutralizing force to reduce magnetic forces and torque exerted on the rotor from the two or more actuator magnets coupled with the stator.

11. The camera of claim 9, wherein a number of magnets of the neutralizing magnets is equal to a number of magnets of the actuator magnets.

12. The camera of claim 9, wherein the neutralizing magnets and the actuator magnets are dual-pole magnets.

13. The camera of claim 9, wherein the voice coil motor (VCM) actuator further comprises:

coupling the one or more coils with the stator with a longest dimension of the one or more coils facing towards a direction parallel to the axis parallel to the optical axis;

coupling the two or more actuator magnets with the rotor with respective magnetic polarities of the at least two actuator magnets according to magnetic polarities of the respective one or more coils such that, when driven with an electric current, the one or more coils are capable of electromagnetically interacting with the at least two actuator magnets; and coupling the two or more neutralizing magnets with the rotor according to the magnetic polarities of the two or actuator magnets such that, the two or more neutralizing magnets interact with the magnetic fields and the magnetic polarities of the two or more actuator magnets, causing the neutralizing force on the rotor.

14. The camera of claim 8, wherein the two or more neutralizing magnets, further comprise:

being coupled with the rotor or stator, further at least based on, forces and torque exerted on the rotor along the axis, wherein the further coupling of the two or more neutralizing magnets with the rotor or stator causes a pre-load reduction force exerted between the rotor and the stator, wherein the pre-load reduction force reduces forces between the rotor and the stator.

15. A method of assembling an optical system, the method comprising:

coupling aperture blades with a stator and a rotor, wherein the aperture blades are arranged to form an aperture stop, wherein the aperture blades are coupled with the stator and the rotor, and wherein the aperture blades are movable to change a size of an aperture defined by the aperture stop;

coupling an actuator with the stator and the rotor for rotating the rotor, relative to the stator, about an axis that is parallel to an optical axis of a camera, wherein the actuator comprises of two or more actuator magnets coupled with the stator or the rotor;

coupling two or more neutralizing magnets, wherein the two or more neutralizing magnets are coupled and positioned with respect to the two or more actuator magnets to cause a neutralizing force on the rotor based on respective magnetic fields and magnetic polarities of the two or more actuator magnets, wherein the neutralizing force reduces torque and forces exerted on the rotor by the magnetic fields and the magnetic forces from the two or more actuator magnets.

16. The method of claim 15, wherein coupling the actuator with the stator or the rotor, comprises:

coupling the two or more actuator magnets with the rotor; and coupling one or more coils with the stator, wherein the one or more coils are positioned proximate to the two or more actuator magnets coupled with the rotor such that, when driven with an electric current, the one or more coils are capable of electromagnetically interacting with the two or more actuator magnets to produce Lorentz forces that rotate the rotor about the axis parallel to the optical axis.

17. The method of claim 15, wherein coupling the actuator with the stator or rotor, comprises:

coupling the two or more actuator magnets with the stator; and coupling one or more coils with the rotor, wherein the one or more coils are positioned proximate to the two or more actuator magnets coupled with the stator such that, when driven with an electric current, the one or more coils are capable of electromagnetically interacting with the two or more actuator magnets to produce Lorentz forces that rotate the rotor about the axis parallel to the optical axis.

18. The method of claim 16, wherein coupling the neutralizing magnets with the rotor comprises coupling an amount of magnets of neutralizing magnets of equal amount to an amount of magnets of actuator magnets coupled with the rotor.

19. The method of claim 16, wherein the neutralizing magnets and the actuator magnets are dual-pole magnets coupled with the rotor.

20. The method of claim 15, wherein coupling the neutralizing magnets with the rotor, further comprises:

coupling the two or more neutralizing magnets with the rotor based on forces and torque exerted on the rotor along the axis, wherein the coupling of the two or more neutralizing magnets with the rotor causes a pre-load reduction force exerted between the rotor and the stator, wherein the pre-load reduction force reduces forces between the rotor and the stator.

\* \* \* \* \*

34